United States Patent [19]

Mihara

[11] Patent Number: 5,119,866
[45] Date of Patent: Jun. 9, 1992

[54] METHOD AND APPARATUS FOR CONTROLLING A CASTING PROCESS BY CONTROLLING THE MOVEMENT OF A SQUEEZING PLUNGER

[75] Inventor: Takeshi Mihara, Ube, Japan

[73] Assignee: UBE Industries, Ltd., Ube, Japan

[21] Appl. No.: 412,192

[22] Filed: Sep. 25, 1989

[30] Foreign Application Priority Data

| Sep. 30, 1988 | [JP] | Japan | 63-244552 |
| Dec. 6, 1988 | [JP] | Japan | 63-306886 |
| Dec. 23, 1988 | [JP] | Japan | 63-323236 |
| Dec. 23, 1988 | [JP] | Japan | 63-323237 |
| Jan. 10, 1989 | [JP] | Japan | 1-1918 |
| Feb. 7, 1989 | [JP] | Japan | 1-26713 |

[51] Int. Cl.$^5$ .............. B22D 27/11; B22D 11/16; B22C 19/04; B29C 45/34
[52] U.S. Cl. .............. 164/120; 164/154; 164/321; 425/149; 425/156; 425/555
[58] Field of Search .............. 164/4.1, 120, 319, 154, 164/155, 320, 321, 150; 264/328.7; 425/149, 156, 160, 555, 577

[56] References Cited

U.S. PATENT DOCUMENTS

| 2,634,468 | 4/1953 | Holder | 164/321 |
| 3,731,727 | 5/1973 | Mitamura | 164/154 |
| 3,767,339 | 10/1973 | Hunkar | 425/149 |
| 3,870,445 | 3/1975 | Hold | 425/149 |
| 4,844,146 | 6/1989 | Kikuchi | 164/319 |
| 4,889,667 | 12/1989 | Kojima | 425/149 |
| 4,911,629 | 3/1990 | Fujita | 425/149 |
| 4,932,458 | 6/1990 | Iwamoto | 164/4.1 |

FOREIGN PATENT DOCUMENTS

| 1197052 | 8/1989 | Japan | 164/120 |
| 275460 | 3/1990 | Japan | 164/120 |
| 2-111518 | 4/1990 | Japan | 425/555 |

Primary Examiner—Richard K. Seidel
Assistant Examiner—Rex E. Pelto
Attorney, Agent, or Firm—Finnegan, Henderson, Farabow, Garrett & Dunner

[57] ABSTRACT

A method and apparatus for controlling a casting process for obtaining a cast product from a cast substance injected into a die cavity of a pair of casting dies by a fluid-operated injecting plunger and pressurized by a fluid operated squeezing plunger after the completion of an injecting process. Actual movement of the squeezing plunger is controlled to copy a desired curve with respect to a desired movement of the squeezing plunger versus an elapse of time from the start of the actual movement of the squeezing plunger.

26 Claims, 20 Drawing Sheets

*Fig. 7*
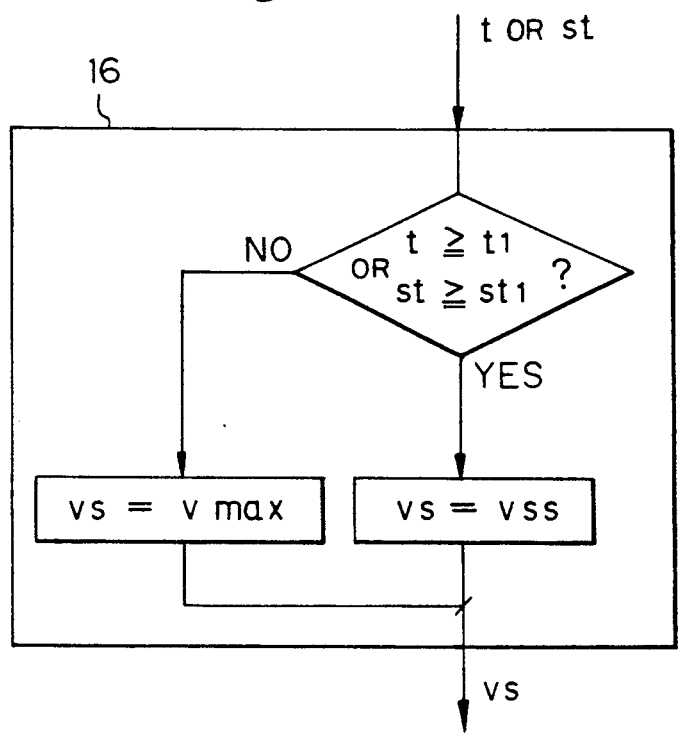
*Fig. 8A*   *Fig. 8B*   *Fig. 8C*
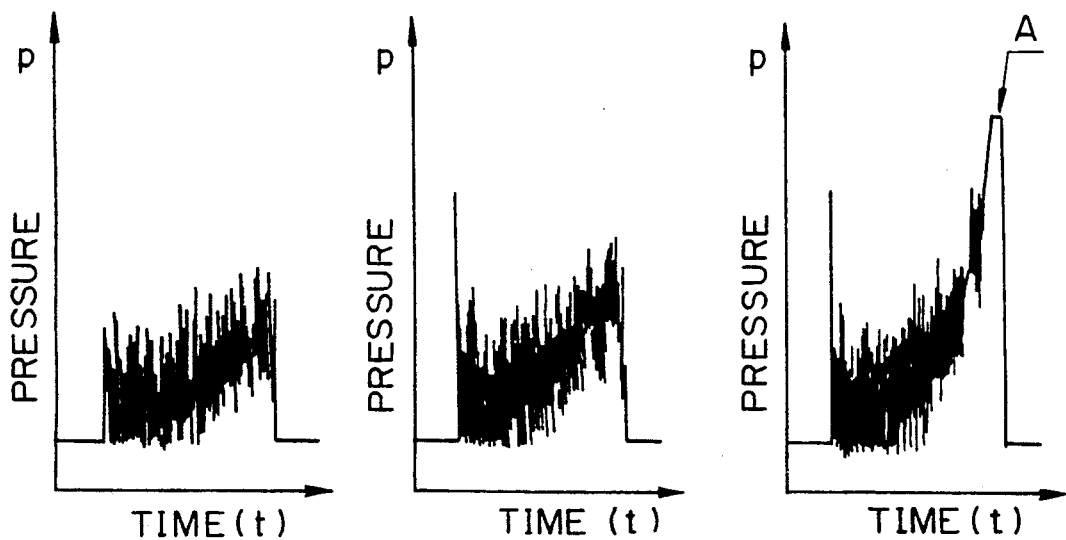

| Fig. 9A | Fig. 9B |

| Fig. 11A | Fig. 11B |

Fig. 21A (PRIOR ART)
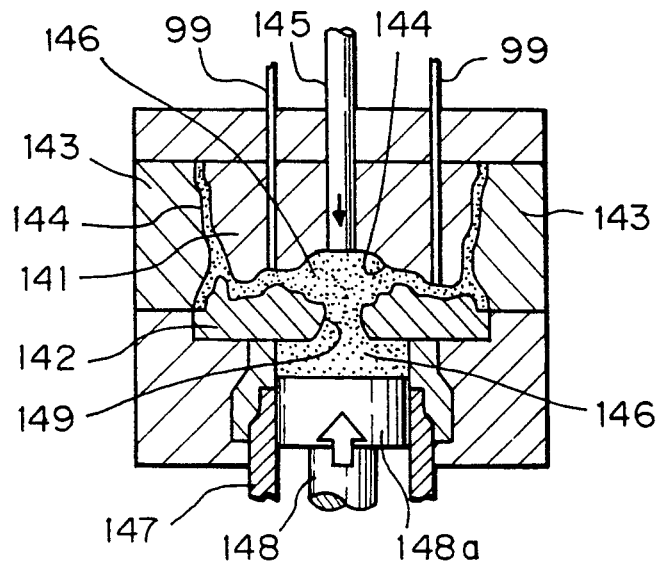
Fig. 21B (P/A)
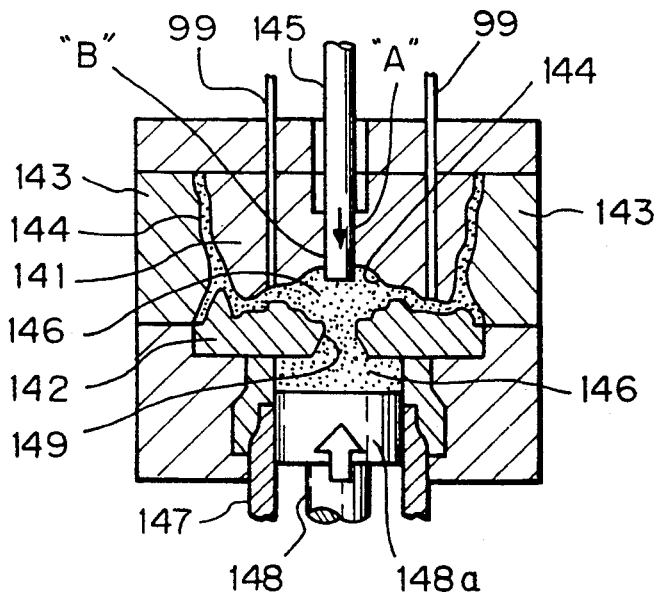

Fig. 21C (P/A)
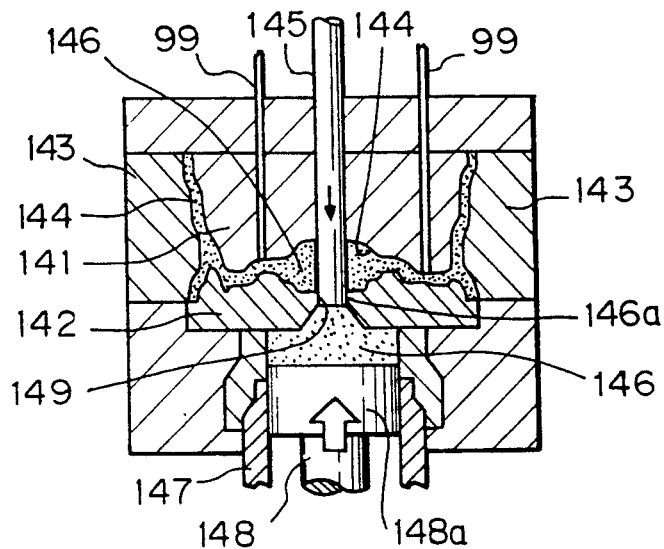
Fig. 21D (P/A)
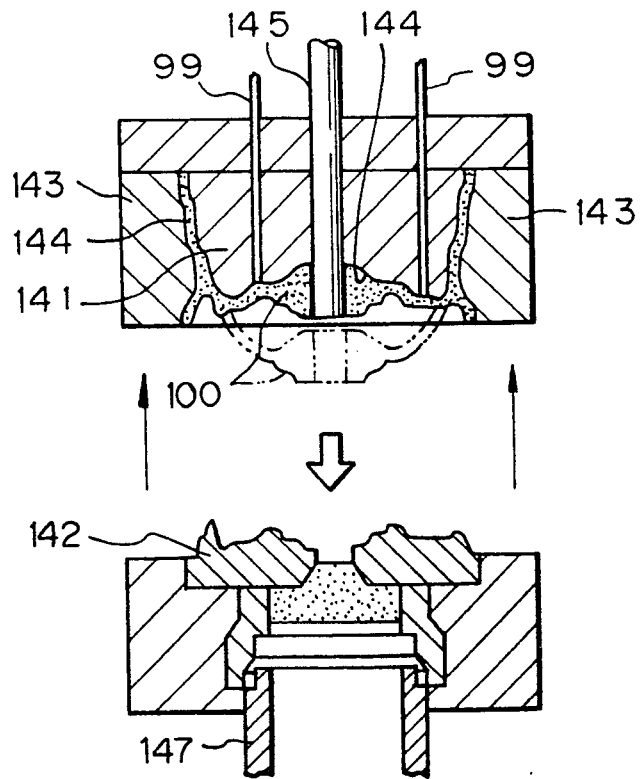

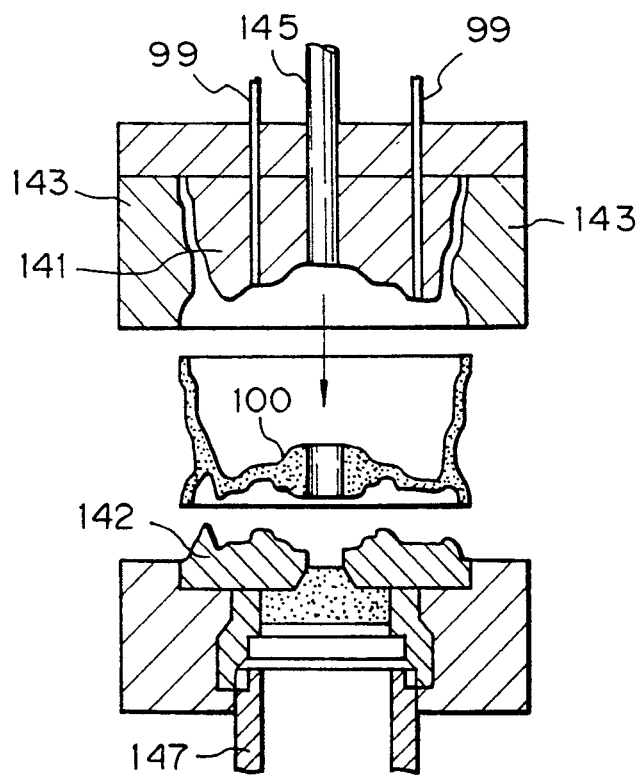
Fig. 21E (P/A)

5,119,866

METHOD AND APPARATUS FOR CONTROLLING A CASTING PROCESS BY CONTROLLING THE MOVEMENT OF A SQUEEZING PLUNGER

BACKGROUND OF THE INVENTION

1. Field of the Invention

The present invention generally relates to a method of and an apparatus for controlling a movement of a sliding piston of a fluid-operated cylinder to be used with hydraulic machines, and more particularly, relates to a method of and apparatus for controlling a molding process by controlling a position and an output force of a sliding-piston of a hydraulic cylinder used as an injection cylinder for actuating an injection plunger and a pressurizing cylinder for operating a melt pressing plunger of die casting and injection molding machines and an extrusion cylinder of an extrusion machine.

2. Description of the Related Art

Fluid-operated cylinders with a sliding-piston are conventionally used as an injection cylinder for injecting molten metal or plastic into dies of a die casting machine or molds of a plastic molding machine. The fluid-operated cylinders are also used as a pressurizing cylinder for pressurizing the molten metal or plastics injected in the dies or molds to produce a melt pressing effect to thereby compensate for shrinkage of the molten metal or plastics in the die cavity. This pressure imposed by the pressurizing cylinder will be hereinafter referred to as "a squeeze pressure". The movement of the sliding-piston of the fluid-operated cylinder is controlled in such a manner that a change in the position of the sliding-piston with respect to a reference position thereof (i.e., the stroke of the sliding-piston) is detected by a position detector, and a detection signal output by the position detector is fed back, via a programmed speed setter, to a servo valve for controlling moving speed of the sliding-piston of the fluid-operated cylinder to a predetermined value at a predetermined position thereof. It has been found, however, that the control of the above-mentioned moving speed of the sliding-piston of the fluid-operated cylinder with respect to the stroke of the piston is not adequate for controlling the casting or molding process of the die casting or injection mold machines from the view point of the need for precise and high quality castings and molded products.

In this connection, U.S. Pat. No. 4,840,557 to Kenji Ishimoto et al discloses a vertical die casting machine adopted for producing disc wheel castings for cars.

FIGS. 21A through 21E illustrate a casting process of the disc wheel casting by the vertical die casting machine of U.S. Pat. No. 4,840,557. This die vertical casting machine has vertically movable upper and lower dies 141 and 142, and plurality of laterally movable cores 143 which are mated together and clamped by a pressing mechanism via upper and lower platens, to define a die cavity 144. As illustrated in FIG. 21A, when the die cavity 144 is defined between the dies 141 and 142, a melt 146 such as melted aluminum and magnesium is injected from inside a sleeve 147 into the cavity 144 by an upward movement of an injecting plunger 148 having an injection tip 148a at an upper end thereof, which is in turn operated by an injection cylinder (not illustrated in FIGS. 21A through 21E). When a predetermined time has lapsed (i.e., delaying start of pressurizing process for a predetermined time) after completion of the injection of the melt 146 into the die cavity 144, a melt pressing plunger 145 (it will be hereinafter referred to as a squeezing plunger throughout the description of the present application.) is moved down into the die cavity 144 to pressurize the melt 146 therein and feed the die cavity 144, as shown in FIGS. 21B and 21C, by the actuation of a pressurizing cylinder (not shown). Namely, before the melt 146 solidifies, the squeezing plunger 145 is lowered from an intermediate position illustrated in FIG. 21B to a lower position illustrated in FIG. 21C at which the lower end portion of the squeezing plunger 145 seals a gate 149 of the lower die 142 while leaving a thin film of solidified melt 146a around the gate 149. Subsequently, when the injected melt 146 is completely solidified by cooling, the squeezing plunger 145 is moved slightly upward from the gate sealing position of FIG. 21C, and the upper and lower dies 141 and 142 are separated and opened as illustrated in FIG. 21D. Accordingly the solidified melt 146 is vertically split into two parts at the position of the gate 149 where the thin film of solidified melt is formed. Thereafter, as illustrated in FIG. 21E, the cores 143 are retracted from the dies 141 and 142, and a disc wheel casting 100 is ejected from the upper die 141, i.e., an ejector die, by ejector pins 99.

In the above-mentioned die casting process according to the prior art vertical die casting machine, a squeeze pressure exerted by the squeezing plunger 145 is controlled for a time as illustrated in the graph of FIG. 22, in which the abscissa indicates time and the ordinate indicates a change in the squeeze pressure Psq. An injection pressure Pm denotes a pressure level at which the melt 146 is injected into the die cavity 144. From FIG. 22, it is understood that a pressure of the squeezing plunger 145, i.e., the squeeze pressure Psq, is applied step-wise in four different pressure stages. The time 0 indicates a starting time of the application of the squeeze pressure Psq and corresponds to a time after the lapse of fractions of one second or approximately 1.0 second (a predetermined lag time) from the time of completing the injection of the melt 146 into the die cavity 144. This starting time is determined by the operation of an appropriate timer device started by detecting the time of completion of the injection of the melt 146, using a detector such as a pressure detector for detecting a pressure within the die cavity 144 or a rise in the operating pressure of the injecting cylinder, and a measuring unit for measuring an amount of stroke of the injecting plunger 148.

Further, an interval between the time 0 and a time $t_1$ in FIG. 22 indicates a region in which the squeezing plunger 145 is moved down while breaking a chill surface layer of the melt 146 formed when the injected melt 146 comes into contact with inner surfaces of the upper and lower dies 141 and 142. During this interval, the squeezing plunger 145 moved downward in the die cavity 144 while squeezing the solidifying melt 146, and therefore, a very high squeeze pressure must be exerted by the squeezing plunger 145 actuated by the squeezing cylinder. An interval between the times $t_1$ and $t_2$ indicates a region in which the melt 146 is gradually cooled to be solidified from the melted state. As a result, in compliance with the cooling of the melt 146, the melt per se shrinks, and therefore, the squeezing plunger 145 is moved down in the melt 146 during the interval between $t_1$ and $t_2$ to exert a relatively low squeeze pressure and thereby compensate for the shrinkage of the melt 146. Namely, the squeeze pressure Psq during the interval between the time $t_1$ and the time $t_2$ is set to be either slightly larger or less than the injection pressure Pm, depending on the shape of the casting 100. In some cases, the squeeze pressure during this interval is set to be approximately equal to the injection pressure Pm. An interval between the time $t_2$ and $t_3$ of FIG. 22 indicates a region in which the melt 146 in the die cavity 144 is cooled and partly solidified to cause shrinking of the cooled melt 146. This shrinkage of the melt permits holes or cavities to be generated inside the melt, and therefore, at the time $t_2$, a higher squeeze pressure is applied by the squeezing plunger 145 to prevent the generation of the holes or cavities inside the solidified melt 146. An interval between the times $t_3$ and $t_4$ indicates an additional or final region in which the squeezing plunger 145 is moved down to the position of the gate 149 of the lower die 142, to permit the formation of the above-mentioned thin film of the solidified melt 146a.

When the casting process is started when the upper and lower casting dies 141 and 142 are cold, the squeezing plunger 145 and the upper die 141 are heated by the melt 146 injected in the die cavity 144, and thermally expanded, respectively. Nevertheless, the amount of thermal expansion of the squeezing plunger 145 and the upper dies 141 is different, because of differences in the coefficients of the thermal expansion thereof, the cooling method applied, and an amount of heat absorbed by both elements. As a result, when the squeezing plunger 145 is repeatedly moved down into the die cavity 44 during a number of casting cycles, a frictional resistance at a portion "A" of FIG. 21B, to which the plunger 145 is subjected, changes, and further, intrusion of the melt 146 into a clearance between the plunger 145 and a bore of the upper die casting 141 also causes a change in a resistance to the downward movement of the squeezing plunger 145 at a portion designated by "B" in FIG. 21B, in respective squeezing operations of the squeezing plunger 145.

Therefore, when the operation of the squeezing plunger 145 is controlled in the conventional method to exert the squeeze pressures Psq in a step-wise manner as shown FIG. 23, an actual movement of the plunger 145 into the die cavity, i.e., the stroke of the squeezing plunger 145, must be gradually changed in response to a change in the above-mentioned resistance acting against the squeezing plunger 145 during a number of casting cycles of the die casting machine of FIGS. 21A through 21E.

FIG. 23 illustrates that, when the casting operation of the die casting machine is started when the upper and lower dies 141 and 142 are cold by employing the conventional method of controlling squeeze pressures Psq in the step-wise manner shown in FIG. 22, the stroke St of the squeezing plunger 145 is gradually shortened in response to an increase in the number of casting cycles, as shown by an arrow. Namely, in the first casting operation of the die casting machine, the stroke "St" of the squeezing plunger 145 with respect to the elapse of the time "t" changes according to a curve (a) of FIG. 23. Nevertheless, when the die casting machine is continuously operated to perform a number of casting operations, the stroke of the squeezing plunger 145 operated by the non-illustrated pressurizing cylinder becomes short, as shown by the curves (b), (c) and (d) of FIG. 23, in response to an increase in the number of casting cycles. This occurs due to the afore-mentioned increase in the resistance against or a load applied to the squeezing plunger 145.

Since the application of the squeeze pressure by the squeezing plunger 145 is effected to supply a feed needed to compensate for a void or cavity in the melt 146 in the die cavity 144, due to the shrinkage of the melt 146, the above-mentioned shortening of the stroke of the squeezing plunger 145 in response to an increase in the number of the casting operations fails to compensate for the void of the melt 146 in the die cavity 144, and as a result, high quality castings cannot be obtained.

In addition, when the stroke of the squeezing plunger 145 is shortened, and therefore the plunger 145 cannot be moved to the position at which it seals the gate 149 as shown in FIG. 21C, the gate 149 will be filled with the solidified melt 146, i.e., the thin film-like cylindrical portion 146a of the solidified melt normally formed at the gate 149 of the lower casting die 142 cannot be obtained. Accordingly, as can be seen in FIG. 21D, when the upper and lower casting dies 141 and 142 are opened vertically to take the casing 100 from the die cavity 144 without removing the cores 143, a large force is needed to separate the solidified melt at the gate 149 of the lower casting die 142, and since the cores 143 are not yet taken out, the solidified melt 146 is pulled downward by a large force exerted by the downward moving lower casting die 142 to separate the solidified melt 146 at the gate 149. Therefore, the casting 100 might be deformed as shown by two dots chain lines in FIG. 21D.

From the foregoing description of the die casting process according to the prior art, it can be understood that, when the step-wise method of control of the squeeze pressure is adopted, it is necessary for an operator to monitor the operation of the squeezing plunger 145 and manually adjust a force applied to the squeezing plunge 145, i.e., a pressing force exerted by the pressurizing cylinder, and the timing for changing the squeeze pressure levels. This is very cumbersome and difficult and a satisfactory adjustment of the squeeze pressure levels by the operator can not be practically effected. Therefore, there is an urgent need for an improvement of the prior art method of controlling the operation of the die casting and molding machines, as well as the operation of a fluid-operated cylinder with a sliding piston to be used as an actuator of the die casting or plastic molding machine.

SUMMARY OF THE INVENTION

Accordingly, an object of the present invention is to solve the problems encountered by the hydraulic machines such as die casting machines, plastic molding machines, and extrusion machines, employing fluid-operated cylinders as actuators for injecting a material to be cast or molded, for applying a squeeze pressure to the material to be cast or molded, and for extruding a metallic or plastic material through the extrusion dies.

Another object of the present invention is to provide a novel method of and apparatus for controlling the casting or molding operation of a die casting or molding machines, especially vertical die casting or plastic molding machines, whereby precise and high quality cast or molded products can be obtained.

A further object of the present invention is to provide a method of and apparatus for controlling the casting and molding operation of die casting and plastic molding machines, by utilizing electronic computers, i.e., microcomputers or personal computers, to carry out an accurate and stable control of the injecting and/or pressurizing process.

A still further object of the present invention is to provide a novel method and apparatus for controlling the operation of a fluid-operated cylinder to be used with hydraulic machines, wherein electronic computers are employed for achieving feedback control of the operation of the fluid-operated cylinder.

A further object of the present invention is to provide a method of and an apparatus for controlling the stroke and output force of a fluid-operated cylinder to be used with various hydraulic machines, particularly, die casting and molding machines.

In accordance with one aspect of the present invention, there is provided a method of controlling a casting process for obtaining a cast product from a substance to be cast, including injecting the substance into a die cavity of casting dies by an injecting plunger, and applying a squeeze pressure to the substance to be molded in the die cavity from a squeezing plunger operated by a fluid-operated pressurizing cylinder. This method comprises the steps of:

- predetermining a desire curve with respect to an amount of stroke movement of the squeezing plunger versus elapse of time from a start of stroke movement of the squeezing plunger into the die cavity; and
- controlling an actual stroke movement of the squeezing plunger from the start of stroke movement thereof to copy the desired curve when the squeeze pressure is applied to the substance to be cast in the die cavity.

In accordance with another aspect of the present invention, there is provided an apparatus for controlling a casting operation of a casting machine provided with an assembly of casting dies and at least one core element cooperable with the casting dies to define a die cavity when the casting dies and the core element are mated, an injecting plunger operable to inject a substance to be cast into the die cavity, a fluid-operated injecting cylinder operating the injecting plunger, a squeezing plunger slidably disposed in a part of the casting dies and operable to be moved into the die cavity to thereby apply a squeeze pressure to the substance injected in the die cavity, and a fluid-operated pressurizing cylinder operating the squeezing plunger. This apparatus comprises:

- a position detecting unit for generating an electric signal indicating a detection of a position of the squeezing plunger projected from a predetermined retracted position thereof;
- at least one valve unit for controlling a fluid pressure supplied from a fluid pressure source to the fluid-operated pressurizing cylinder in response to an extent of a valve drive signal, to thereby control an actual stroke movement of said squeezing plunger;
- a valve drive unit for generating the valve drive signal upon receipt of a drive command signal; and
- at least one feedback control unit including at least one command signal setter for presetting therein a desired curve with respect to a desired amount of stroke movement of the squeezing plunger versus an elapse of time from a start of stroke movement of the squeezing plunger into the die cavity, the command signal setter being able to generate an output signal indicating the desired amount of stroke movement of the squeezing plunger derived from the desired curve, and a signal processing means capable of detecting an error between the electric signal of the position detecting unit and the output signal of the command signal setter, and generating the drive command signal as a feedback signal to be supplied from the feedback control unit to the valve drive unit, the drive command signal varying in response to an extent of the error detected by the signal processing means to enable the actual stroke movement of said squeezing plunger to copy the desired curve.

In accordance with a further aspect of the present invention, there is provided an apparatus for controlling a fluid-operated cylinder including a sliding piston element having a slidable piston and a piston rod extending from the piston and moving from a predetermined retracted position thereof to an extended position thereof, and first and second fluid chambers defined on opposite sides of the slidable piston, the first and second fluid chambers being fluidly connected to a fluid pressure source. The apparatus comprising:

- a position detecting unit for generating an electric signal indicating a detection of the extended position of the piston rod from the predetermined retracted position;
- fluid conduits for supplying a fluid pressure to the first and second fluid chambers from the fluid pressure source;
- a flow control valve unit for selectively connecting the first and second fluid chamber with the fluid pressure source;
- a first fluid pressure control valve unit for adjustable changing the fluid pressure supplied from the fluid pressure source to the first and second fluid chambers of the fluid-operated cylinder via the flow control valve means;
- a valve drive unit for generating a valve drive signal upon receipt of a drive command signal; and
- a feedback control unit including: a command signal setter for presetting therein a desired curve with respect to a desired amount of extension of the piston rod from the predetermined retracted position versus an elapse of time from a start of the extension of the piston rod toward the extended position thereof, the command signal setter generating an output signal indicating the desired amount of extension of the piston rod derived from the desired curve; and a signal processing unit for detecting an error between the electric signal of the position detecting unit and the output signal of the command signal setter, and generating the drive command signal as a feedback signal to be supplied to the valve drive unit, the drive command signal varying in response to an extent of the error detected by the signal processing unit to enable the amount of extension of the piston rod to copy the desired curve.

BRIEF DESCRIPTION OF THE DRAWINGS

The above and other objects, features, and advantages of the present invention will be made more apparent from the ensuing description of preferred embodiments with reference to the accompanying drawings wherein:

FIG. 7 is a schematic view of a pressure limiter of the apparatus of FIG. 5, illustrating the programmed operation of the pressure limiter according to the present invention;

FIGS. 8A through 8C are graphs indicating a relationship between a measured pressure and an elapse of time when the method of the present invention is carried out;

FIGS. 21A through 21E are schematic views of a pair of casting dies and associated injecting and squeezing plungers according to a prior art, illustrating the sequential casting processes;

DESCRIPTION OF THE PREFERRED EMBODIMENTS

Figure 1:
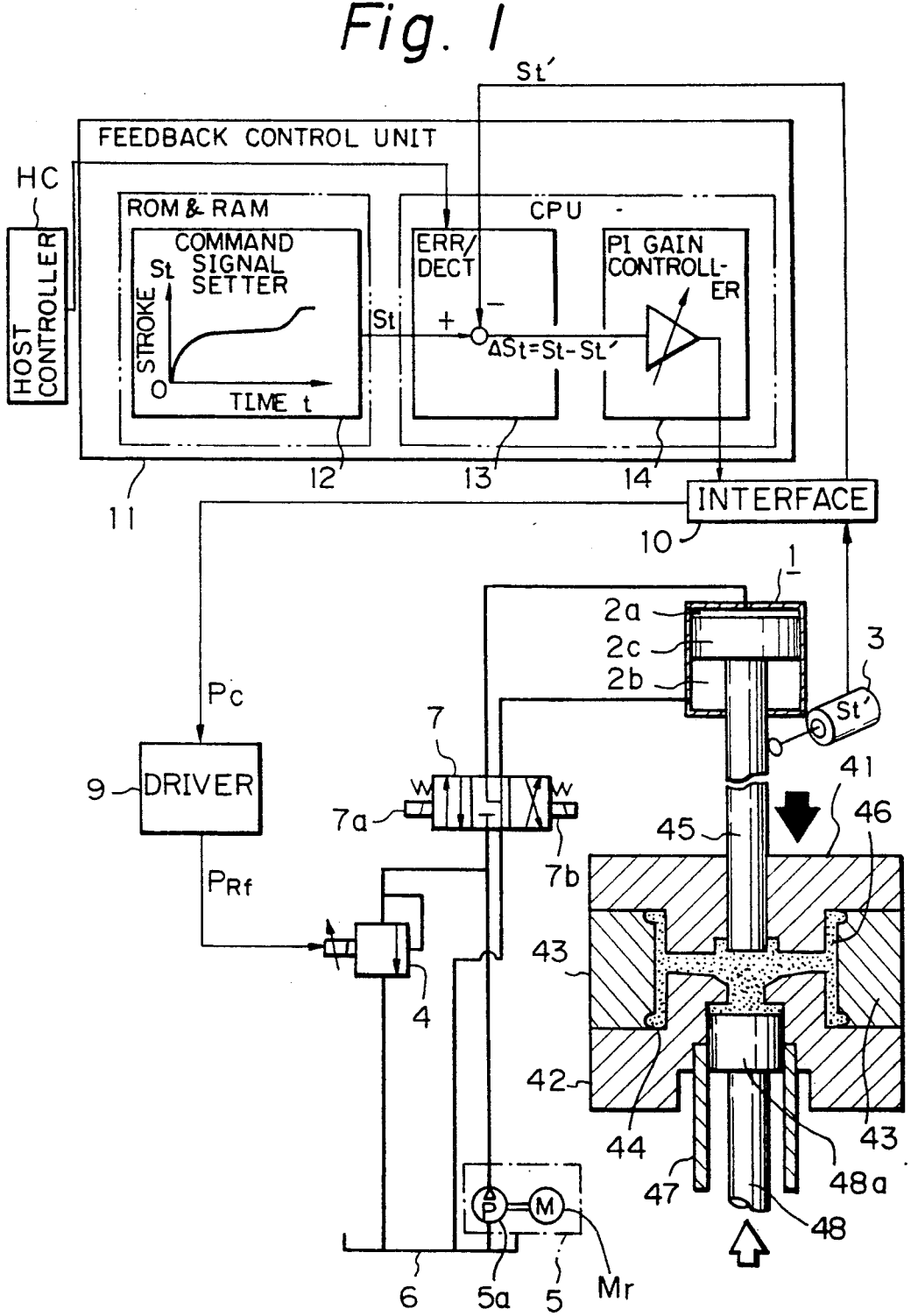
FIG. 1 is a block diagram of an apparatus for controlling the operation of a die casting machine according to an embodiment of the present invention.

It should be understood that, throughout the drawings of the embodiments of the present invention, like or same elements and parts are designated by the same reference numerals and the same references, with suffixes "a" and "b".

Referring to FIG. 1, a vertical die casting machine has an upper casting die 41, a lower casting die 42, and a plurality of cores 43 brought to a closing state in together to define a die cavity 44. The vertical casting machine also has an injecting plunger 48 disposed beneath the lower casting die 42 and having an injecting tip 48a at an uppermost end thereof, and a squeezing plunger 45 slidably disposed in the upper casting die 41 to vertically oppose the injecting plunger 48. The injecting plunger 48 and the injecting tip 48a are moved upward together to inject a substance to be cast, i.e., a melt 46 from an injecting sleeve 47, into the die cavity 44. The squeezing plunger 45 is moved downward into the die cavity 44 to pressurize the melt 46 in the die cavity 44. The squeezing plunger 45 is connected to a piston element 2 of a pressurizing cylinder 1 mounted on a not shown movable top plate and operated under a fluid pressure, e.g., a hydraulic pressure. The squeezing plunger 45 is arranged in such a manner that a front end thereof (i.e., the lowermost end in the present embodiment) can be vertically moved through the melt 46 filled in the die cavity 44 to a position at which the front end of the squeezing plunger 45 seals a gate in the die cavity 44. Alternatively, the squeezing plunger 45 may be arranged to be moved in a direction different from the illustrated vertical direction.

As can be seen from a hydraulic circuit of FIG. 1, the pressurizing cylinder 1 moving the squeezing plunger 45 is hydraulically operated by a pressurized liquid or oil supplied from a liquid pressure source or a hydraulic power source 5 provided with a hydraulic pump 5a and a drive motor Mr, and the movement of the piston element 2 between a head chamber 1a and a rod chamber 1b is controlled by a solenoid-operated directional control valve 7 disposed in liquid conduits connecting the pressurizing cylinder 1 with the hydraulic power source 5. The solenoid-operated directional control valve 7 has solenoids 7a and 7b, and when the solenoid 7a is energized, the valve 7 is switched to a position at which the pressurized oil is introduced from the hydraulic power source 5 into the head chamber 1a of the pressurizing cylinder 1, and the pressurized oil in the rod chamber 1b is released into a oil tank 6. As a result, the piston element 2 of the pressurizing cylinder 1 is advanced and extended outward to move the squeezing plunger 45 and thereby cause the front end of the plunger 45 to project into the die cavity 44 as illustrated in FIG. 1. Conversely, when the solenoid 7b of the solenoid-operated directional control valve 7 is energized, the motion of the piston element 2 of the pressurizing cylinder 1 is reversed, and therefore, the front end of the pressurizing cylinder 1 is retracted from inside the die cavity 44 into the upper casting die 41. The hydraulic circuit of FIG. 1 is also provided with a solenoid-operated automatic pressure relief valve 4 for regulating a pressure level of the pressurized liquid supplied from the hydraulic power source 5 in proportion to the energization of the solenoid when passing therethrough. Namely, the solenoid-operated automatic pressure relief valve 4 operates in accordance with an extent of an input signal supplied thereto, to thereby regulate the hydraulic power of liquid pressure to be used for controlling the movement of the squeezing plunger 45. The movement, i.e., an amount extension or stroke, of the squeezing plunger 45 from the retracted position thereof, and therefore, the movement of the piston element 2 of the pressurizing cylinder 1, is detected by a position detector 3 consisting of, e.g., an electric potentiometer. A detected signal in the form of an electric signal indicating a position of the squeezing plunger 45 with respect to the retracted position thereof is output from the position detector 3.

To control the movement of the above-mentioned pressurizing cylinder 1 and the squeezing plunger 45, there is provided a control apparatus including a feedback control unit 11 provided with a command signal setter 12, an error detector 13, and a gain controller 14. The command signal setter 12 is provided for setting therein a programmed model of a desired curve with respect to a desired stroke movement of the squeezing plunger 45 into the die cavity 44 versus an elapse of time, and for issuing a command information signal derived from the desired curve through an output thereof. Therefore, the command signal setter 12 may be constituted by a memory unit, such as random access memory (RAM) or other erasable memory element. In the illustrated embodiment, the command signal setter 12 also includes a read-only-memory (ROM) in which other control programs may be stored to control the operation of the error detector 13 and the gain controller 14.

The error detector 13 is provided for comparing the command information signal supplied from the command signal setter 12 with the electric signal of the position detector 3, to detect an error between both signals. The detected error is output from the error detector 13 in the form of a signal having an extent which depends on the extent of the detected error. The gain controller (PI gain controller) 14 is arranged for appropriately processing the signal supplied from the error detector 13 into a feedback signal to be issued from the feedback control unit 7. In practice, the gain controller 14 carries out the processing action to apply proportional plus integral plus differential gains (PID gain) to the signal of the error detector 13. The error detector 13 and the gain controller 14 may be constituted by a commercially available central processing unit (CPU) having a computing function and a control function. Therefore, the feedback control unit 7 per se may be constituted by a conventional electronic microcomputer or a personal computer. When the feedback control unit 7 consists of a microcomputer or a personal computer, an interface unit 10 is arranged between input/output ports of the feedback control unit 7 and the system of the casting machine.

A driver 9 is provided for receiving the feedback signal Pc from the gain controller 14 of the feedback control unit 7 and for converting the feedback signal Pc into a drive signal $P_{Rf}$ to drive the afore-mentioned solenoid-operated automatic pressure relief valve 4.

The description of the operation of the above-mentioned control apparatus will now be given.

When the injection of the melt 46 into the die cavity 44 of the casting dies 41 and 42 is completed by the injecting plunger 48 as illustrated in FIG. 1, and when a predetermined time before the start of the pressurizing process has passed, a command signal to operate the squeezing plunger 45 is supplied to the feedback control unit 7 by a host controller (a sequencer) HC. The host controller HC also supplies an energizing signal to the solenoid 7a of the solenoid-operated directional control valve 7. When the feedback control unit 7 receives the command signal from the host controller HC, the command signal setter 12 supplies a desired stroke St of the squeezing plunger 45 versus a time t derived from the desired curve programmed therein, to the subsequent error detector 13 by the time division method at respective fraction of one thousand milliseconds (one second). Then the error detector 13 subtracts an actual position St' of the squeezing plunger 45 detected by the position detector 3 from the desired stroke St to detect an error $\Delta$St ($=$St$-$St'), and supplies the error $\Delta$St to the subsequent gain controller 14. The gain controller 14 multiplies predetermined PID gains for the error $\Delta$St to thereby convert the error $\Delta$St of the stroke of the squeezing plunger 45 into a feedback signal which corresponds to a liquid pressure signal Pc output from the interface 10. At this stage, it should be understood that the PID gains are experimentally determined by practically operating the squeezing plunger 45 via the pressurizing cylinder 1 to obtain the best operation of the squeezing plunger 45, to copy the desired curve set in the command signal setter 12. The driver 9 receiving the signal Pc converts the signal Pc into an actual drive signal $P_{Rf}$, and supplies it to the solenoid-operated automatic pressure relief valve 4, and thus the pressure relief valve 4 adjusts the hydraulic pressure supplied from the hydraulic power source 5. Namely, the feedback control of the stroke of the squeezing plunger 45 on the basis of the comparison of the desired and actual strokes St and St' is effected by a control method according to the present invention.

Figure 2A:
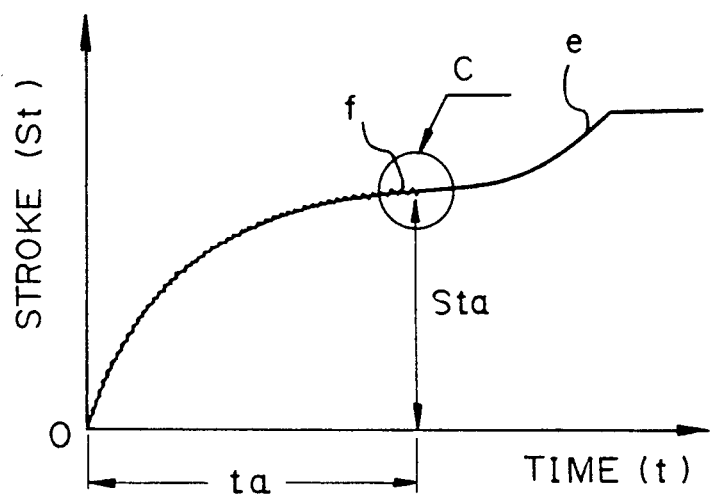
FIG. 2A is a graph illustrating a relationship between a stroke of a squeezing plunger and an elapse of time, according to a method of the present invention.
Figure 2B:
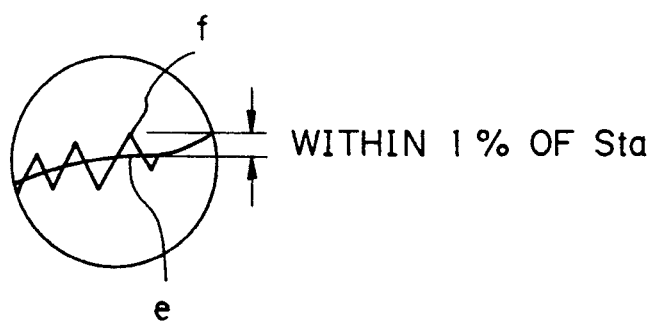
FIG. 2B is an enlarged view of a part C of FIG. 2A.

The graphical illustration of FIG. 2A indicates a result of a practical experiment of the feedback control of the stroke of the squeezing plunger 45, conducted by the inventor and displayed on a non-illustrated monitoring display, i.e., a CRT display. The experiment was conducted by a time division method at respective fractions of one thousand milliseconds to derive a desired stroke St of the squeezing plunger 45 from the program of the desired curve (St versus t) while taking into account the frequency response characteristics of the solenoid-operated automatic pressure relief valve 4 and the moving speed of the squeezing plunger 45. As can be seen from FIG. 2A, an error $\Delta$St of the actual stroke St' of the plunger 45 from the desired stroke St at a given time $T_a$ is within 1.0% of the desired stroke St. In FIGS. 2A and 2B, a smooth curve "e" indicates the desired curve of the stroke of the squeezing plunger 45 which is programmed and stored in the command signal setter 12 of the feedback control unit 7. Preferably, the curve "e" is set by use of a mouse of the personal computer while monitoring the CRT display, to enable an operator to easily set a desired curve of the stroke of the squeezing plunger 45. A zig-zag line "f" of FIGS. 2A and 2B indicates the actual stroke of the squeezing plunger 45 during the feedback control of the operation thereof. From the foregoing description of the embodiment of the control apparatus for a casting machine, it will be understood that the movement of the squeezing plunger 45 to provide the melt injected in the die cavity 44 of the casting dies 41 and 42 and the cores 43 with a squeezing pressure can be accurately controlled to copy the desired curve with respect to the desired stroke versus the elapse of time. Therefore, the stroke of the squeezing plunger 45 of the casting machine can be automatically stabilized without an adversely affect by the frictional resistance between the squeezing plunger 45 and the upper casting die 41 and the intrusion of the melt 46. Accordingly, manual adjustments by the operator are not needed, and a stable casting condition is established during a number of casting cycles, and consequently, precise and high quality cast products can be constantly obtained.

It should be understood that the feedback control method and apparatus of the foregoing embodiment may be easily used not only for the described cylinder-operated squeezing plunger but also for a cylinder-operated injecting plunger, as required.

Further, the control method and apparatus may be utilized by many kinds of lateral casting machines and injection molding machines in addition to the described vertical die casting machine with a squeezing plunger and the vertical die casting machine without a squeezing plunger.

Figure 3:
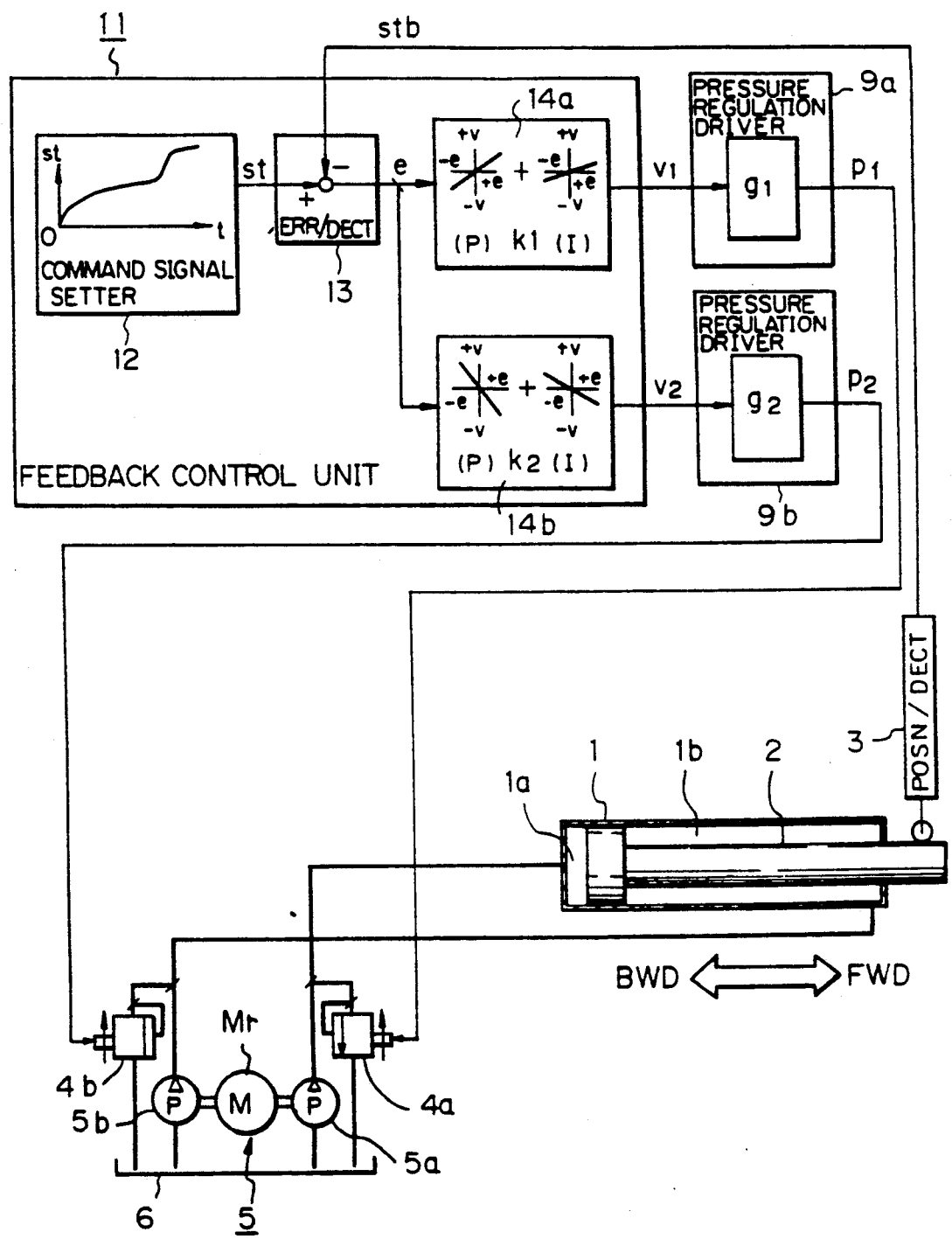
FIG. 3 is a block diagram of a controlling apparatus for controlling a fluid-operated cylinder, according to an embodiment of the present invention.

FIG. 3 illustrates another embodiment of the present invention for controlling the operation of a fluid-operated cylinder to be used as hydraulic actuators for many kinds of hydraulic machines, particularly, a die casting machine for producing castings from molten metal or plastic, i.e., melt injected into a die cavity, an injection molding machine for producing molded products from plastics injected into the metallic mold cavity, and an extrusion machine for producing extended products from an metallic substance such as aluminum.

A fluid-operated cylinder 1 used as, e.g., an injecting cylinder of an injection casting machine includes a piston element 2 having a piston and a piston rod, and a head and rod chambers 1a and 1b arranged on opposite sides of the piston of the piston element 2. The head chamber 1a of the cylinder 1 is fluidly connected to a pump 5a of a hydraulic power source 5 via a solenoid-operated automatic pressure relief valve 4a arranged in a hydraulic circuit, and the rod chamber 1b of the cylinder 1 is fluidly connected to a hydraulic pump 5b via a solenoid-operated automatic pressure relief valve 4b arranged in the hydraulic circuit. Although the pumps 5a and 5b are commonly driven by a drive motor Mr, both have separate and different performances. The solenoid-operated automatic pressure relief valves 4a and 4b are similar to the valve 4 of the embodiment of FIG. 1, and regulate hydraulic pressures from the hydraulic pumps 5a and 5b, respectively and independently. Namely, the hydraulic pressures supplied from respective hydraulic pressure sources 5a and 5b to operate the piston element 2 of the fluid-operated cylinder 1 can be regulated by the solenoid pressure relief valves 4a and 4b upon receipt of electric input signals, respectively. For example, when the solenoid pressure relief valve 4a is energized to regulate the hydraulic pressure from the hydraulic pump 5a to a high pressure level, and simultaneously, when the solenoid pressure relief valve 4b is energized to reduce the hydraulic pressure from the hydraulic pump 5b to a low pressure level, the fluid at the former high hydraulic pressure flows from the pump 5a into the head chamber 1a, and the fluid from the pump 5b as well as the fluid in the rod chamber 1b are relieved into a hydraulic tank 6 of the hydraulic power source 5. Accordingly, the piston element 2 of the fluid-operated cylinder 1 is moved forward in a direction shown by FWD in FIG. 3. Conversely, when the solenoid pressure relief valve 4a is energized to reduce the hydraulic pressure from the hydraulic pump 5a to a low pressure level, and simultaneously, when the solenoid pressure relief valve 4b is energized to regulate the hydraulic pressure from the hydraulic pump 5b to a high pressure level, the piston element 2 of the fluid-operated cylinder 1 is moved backward or retracted in a direction shown by BWD in FIG. 3. The movement of the piston element 2 of the fluid-operated cylinder 1, i.e., an extension from the most-retracted position in the BWD direction to a given extended position in the FWD direction is detected by a position detector 3 consisting of a known electric potentiometer, and an electric signal indicating each detected position of the piston element 2 is generated by the position detector 3.

A feedback control unit 11 similar to that of the embodiment of FIG. 1 is arranged for controlling the operation of the above-mentioned fluid-operated cylinder 1. The feedback control unit 11 is different from that of the afore-described embodiment in that two gain controllers 14a and 14b commonly connected to the error detector 13 are provided to generate separate feedback signals $V_1$ and $V_2$ for the above-mentioned solenoid-operated automatic pressure relief valves 4a and 4b, respectively.

Drivers 12a and 12b are arranged between the feedback control unit 11 and the solenoid-operated automatic pressure relief valves 4a and 4b to generate drive signals $P_1$ and $P_2$, which are supplied to the valves 4a and 4b in response to the feedback signals $V_1$ and $V_2$, respectively. Namely, the respective pressure levels of the fluid supplied from the respective hydraulic pumps 5a and 5b of the hydraulic power source 5 are regulated by the solenoid-operated automatic pressure relief valves 4a and 4b in accordance with an extent of each of the drive signals $P_1$ and $P_2$. When the feedback control unit 11 is constituted by an electronic microcomputer or personal computer, a not shown interface unit is arranged between the feedback control unit 11 and the drivers 9a and 9b.

The description of the operation of the control apparatus of the present embodiment will be given with reference to FIG. 3.

When an operation command signal is supplied from a not shown host controller to the feedback control unit 11, the command signal setter 12 preliminarily storing therein a programmed desired curve with respect to a desired stroke St of the piston element 2 of the fluid-operated cylinder 1 versus an elapse of time t, supplies the desired stroke St derived from the illustrated desired curve at respective divided times, i.e., at respective fractions of one thousand milliseconds, to the error detector 13. The stroke St of the piston element 2 from the most retracted position thereof, i.e., 0 position, is identified in such a manner that, when the direction of the movement of the piston element 2 is FWD, the stroke St is considered as positive (+), and conversely, when the direction of the movement of the piston element 2 is BWD, the stroke St is considered as negative (−). When the desired stroke St is supplied, the error detector 13 carries out a calculation to detect an error "e" between an actual stroke Stb of the piston element 2 detected by the position detector 3 and the above-mentioned desired stroke St (e = St − Stb). The detected error "e" is supplied from the error detector 13 to both gain controllers 14a and 14b. The gain controllers 14a and 14b multiply respective proportional plus integral gains $K_1$ and $K_2$ for the error "e", to convert the error into respective feedback signals $V_1$ and $V_2$. At this stage, both gains $K_1$ and $K_2$ of the gain controllers 14a and 14b are usually predetermined to have opposite sign characteristics with respect to the common error "e", as can be seen from the graphs of the gain controllers 14a and 14b, and the inclinations of both PI gains $K_1$ and $K_2$ are experimentarily selected so that the movement of the piston element 2 of the fluid operated cylinder 1 copies or complies with the desired curve programmed in the command signal setter 12. Nevertheless, it should be noted that forces acting on opposite sides of the piston of the piston element 2 are appropriately balanced, and therefore, the gains $K_1$ and $K_2$ of the gain controllers 14a and 14b are predetermined to be in a reverse proportion to the ratio between the area of the head chamber 1a and the area of the rod chamber 1b.

The drivers 9a and 9b converts the feedback signal $V_1$ and $V_2$ of the gain controllers 14a and 14b into corresponding drive signals $P_1$ and $P_2$ respectively, which are supplied to drive the solenoid-operated automatic pressure relief valves 4a and 4b, and therefore, regulate the pressure levels of the pressurized fluids supplied from the respective hydraulic pumps 5a and 5b of the hydraulic power source 5 to the head and rod chambers 1a and 1b, respectively.

For example, when the piston element 2 of the fluid-operated cylinder 1 is moved in the forward direction (FWD direction), and when the afore-mentioned error "e" is positive, the actual stroke of the piston element 2 Stb has not yet reached the desired stroke St. Accordingly, the feedback control unit 11 functions to cause the movement of the piston element 2 of the fluid-operated cylinder 1 in the FWD direction by regulating the pressure levels of the respective pressurized fluids supplied from the separate hydraulic pumps 5a and 5b to the head and rod chambers 1a and 1b of the cylinder 1 until the piston element 2 reaches the desired stroke St. In this case, the pressure level in the head chamber 1a is raised in response to an extent of the error "e", and the pressure level in the rod chamber 1b is lowered in response to the extent of the error "e" by controlling the feedback signals $V_1$ and $V_2$, respectively, while taking into account the characteristics of the PI gains $K_1$ and $K_2$ of the gain controllers 14a and 14b. Conversely, when the error "e" (= St − Stb) is negative, namely the actual stroke Stb of the piston element 2 of the fluid-operated cylinder 1 is extended beyond the desired stroke St, the feedback control unit 11 functions to cause a movement of the piston element 2 of the fluid-operated cylinder 1 in the backward direction (BWD direction) by regulating the pressure levels of the respective pressurized fluids supplied from the separate hydraulic pumps 5a and 5b to the head and rod chambers 1a and 1b of the cylinder 1, until the piston element 2 reaches the desired stroke St from the actual stroke Stb thereof by moving in the BWD direction. Namely, the pressure level in the head chamber 1a is lowered in response to an extent of the error "e", and the pressure level in the rod chamber 1b is raised in response to the extent of the error "e".

From the foregoing description of the operation of the feedback control unit 11 of the control apparatus according to the embodiment of FIG. 3, it will be understood that the actual movement of the piston element 2 of the fluid-operated cylinder 1 can be precisely controlled under a high response performance to comply with the desired curve of the stroke versus an elapse of time. Accordingly, the fluid-operated cylinder 1 controlled by the feedback control unit 11 and the associated control elements can be used as a high quality actuator for various hydraulic machines.

Figure 4:
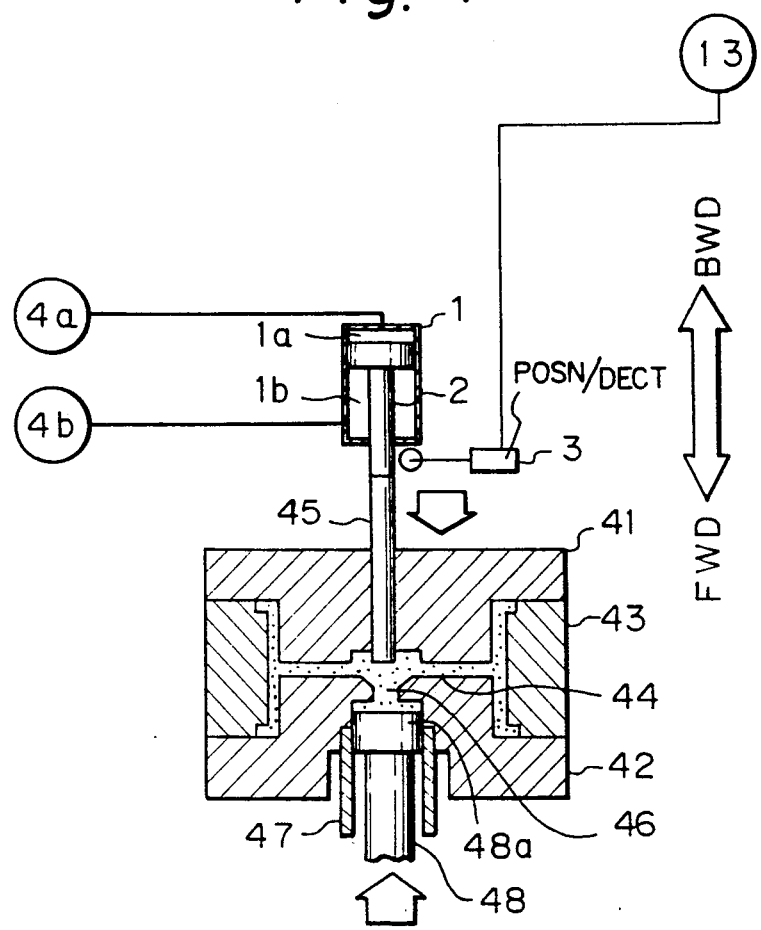
FIG. 4 is a partial block diagram illustrating a die casting machine controlled by the controlling apparatus of FIG. 3.

FIG. 4 illustrates an embodiment in which the fluid-operated cylinder 1 of the afore-mentioned embodiment of FIG. 3 is used for actuating a squeezing plunger of a vertical die casting machine, e.g., a die casting machine for producing car disc wheels. It should be noted that, since that the construction of the die casting machine of the present embodiment is the same as that of the embodiment of FIG. 1, the description of the construction and arrangement of the die casting machine per se is omitted.

In the illustrated die casting machine, the operation of the squeezing plunger 45 connected to the lower end of the piston element 2 of the fluid-operated cylinder 1 is controlled by the cylinder 1 per se to comply with a programmed desired curve during the process of applying a squeeze pressure to the melt 46 in the die cavity 44 of the casting dies 41 and 42. Particularly, since the head and rod chambers 1a and 1b of the fluid-operated cylinder 1 have pressure levels which are simultaneously and respectively controlled, the stroke of the squeezing plunger 45 connected to the piston element 2 of the cylinder 1 can accurately comply with the predetermined desired curve of the stroke versus an elapse of time with an excellent response.

The fluid-operated cylinder 1 may be used as an accurate actuator for controlling the stroke of the injecting plunger 48 during the injecting and pressurizing processes of the die casting machine. The cylinder 1 also may be used as an actuator for other hydraulic machines, such as extrusion machines and injection molding machines.

Figure 5:
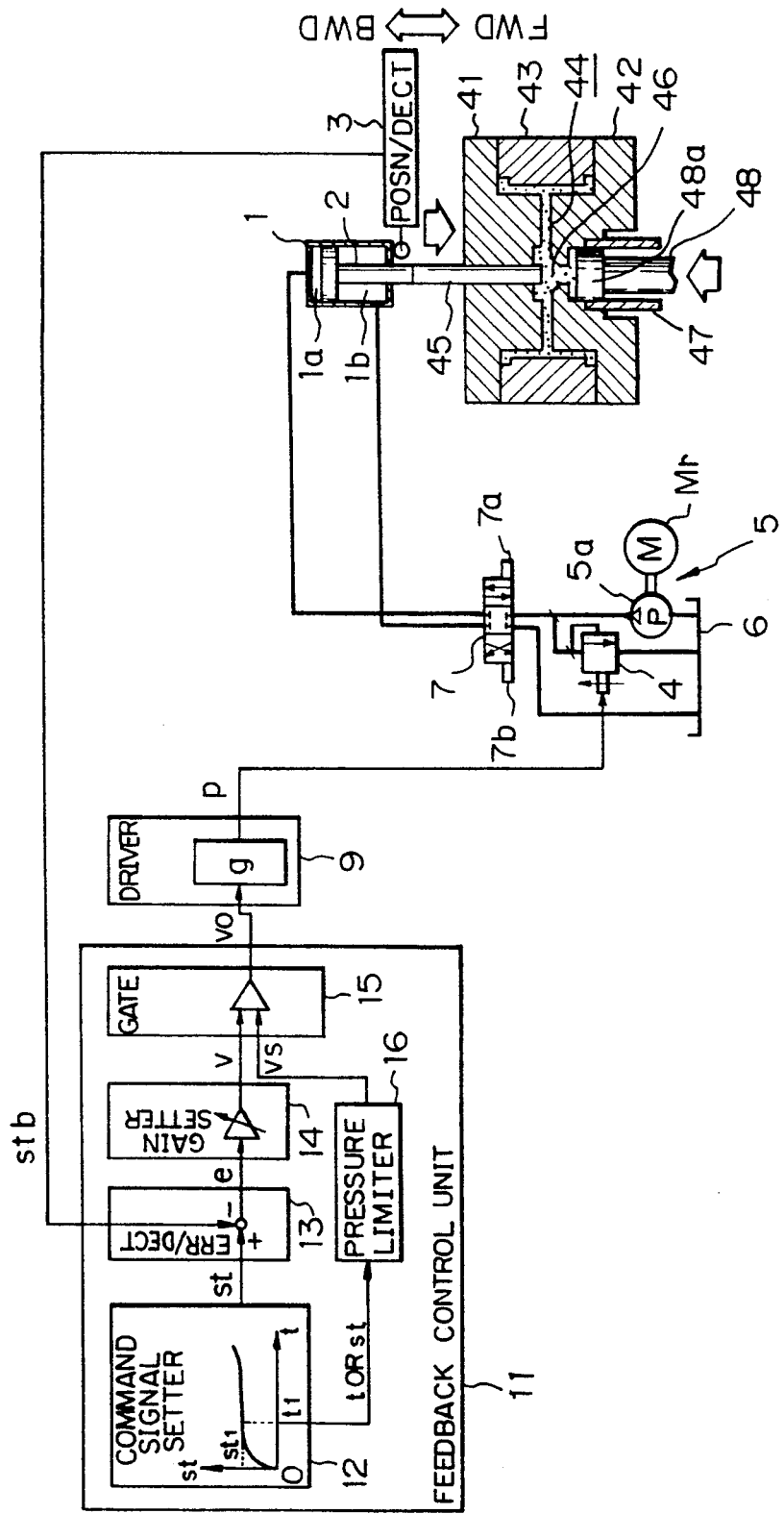
FIG. 5 is a block diagram of an apparatus for controlling the operation of a die casting machine according to another embodiment of the present invention.

FIG. 5 illustrates another embodiment of the present invention, in which the feedback control unit of a control apparatus for a casting machine is further improved to prevent a mechanical seizure which might occur when a squeezing plunger is slid in a bore of a casting die by a pressurizing cylinder against an increase in a frictional resistance between the squeezing plunger and the bore surface of the casting die during a repeated insertion of the squeezing plunger into a melt.

In FIG. 5, the feedback control unit 11 is different from that of the embodiment of FIG. 1 in that it is provided with a gate 15 and a pressure limiter 16 in addition to the command signal setter 12, the error detector 13 and the gain controller 14. The constructions of the casting machine and of the associated hydraulic circuit are the same as those of the embodiment of FIG. 1.

In the feedback control unit 11 of the present embodiment, a signal "v" processed and output by the gain controller 14 is supplied to the gate 15 which receives a pressure signal "vs" output by the pressure limiter 16. Namely, the gate 15 is provided for producing an output signal "vo" thereof on the basis of the comparison of both signals "v" and "vs". The comparing operation of the gate 15 is based on the equations (I) and (II) set forth below.

$$vo = v \text{ (when } v < vs \text{ is satisfied.)} \quad (I)$$

$$vo = vs \text{ (when } v \geq vs \text{ is satisfied.)} \quad (II)$$

The pressure limiter 16 operates in accordance with, e.g., a program schematically illustrated in FIG. 7.

Referring to FIG. 7, a signal "t" indicating a time or "st" indicating a desired stroke of the squeezing plunger 45 is supplied from the command signal setter 12 to the pressure limiter 16 in which the signal t or st is compared with a predetermined time signal $t_1$ or a predetermined stroke signal $st_1$ to determine whether or not the former signal is equal to or larger than the latter signal. If NO, the signal vs indicating a limiting pressure is output by the pressure limiter 16 toward the gate 15 while denoting that the limiting pressure should be equal to the maximum hydraulic pressure $v_{MAX}$ of the hydraulic power source 5. If YES, the signal vs is output by the pressure limiter 16 toward the gate 15 while denoting that the limiting pressure should be set at a predetermined pressure vss. The gate 15 outputs a drive signal "P" toward the solenoid-operated automatic pressure relief valve 4 for regulating the hydraulic pressure of the pressurized liquid supplied from the hydraulic power source 5 to the pressurizing cylinder 1 via the directional control valve 7.

The operation of the feedback control unit 11 of the present embodiment will be given below.

When a command signal for operating the squeezing plunger 45 is supplied from a not shown host controller to the feedback control unit 11, the feedback control unit 11 starts to operate, and as a result, the solenoid-operated automatic pressure relief valve 4 is energized to adjustably regulate the hydraulic pressure of the pressurized liquid passing therethrough. Accordingly, the stroke of the squeezing plunger 45 is controlled to copy the desired stroke programmed in the command signal setter 12 of the feedback control unit 11. Before predetermined time $t_1$ elapses or before the actual stroke of the squeezing plunger 45 reaches a predetermined stroke $st_1$, the pressure limiter 16 denotes that the limiting pressure of the pressurized liquid supplied to the pressurizing cylinder 1 corresponds to the maximum pressure $v_{MAX}$ of the hydraulic power source 5 as described above, and therefore, the afore-mentioned equation (I) is established in the gate 15. Accordingly, the gate 15 outputs the signal "vo" which corresponds to the signal "v" of the gain controller 14. Nevertheless, when the pressure limiter 16 judges that the time $t_1$ has elapsed or that the actual stroke of the squeezing plunger 45 has become equal to or larger than the predetermined stroke $st_1$, the pressure limiter 16 denotes that the limiting pressure of the pressurized liquid should be "vss". Accordingly, in the gate 15, one of the afore-mentioned equations (I) and (II) is selectively satisfied in accordance with an extent of the limiting pressure vss. Namely, when the output signal "v" of the gain controller 14 is smaller than "vss", the output "vo" of the gate 15 is made equal to "v", and when the output signal "v" of the gain controller 14 is equal to or larger than "vss", the output "vo" of the gate 15 is made equal to "vss".

The reason why the pressure limiter 16 performs the afore-mentioned pressure limiting operation when the time $t_1$ has passed or when the actual stroke of the squeezing plunger 45 is equal to or larger than $st_1$ is now described.

Figure 6:
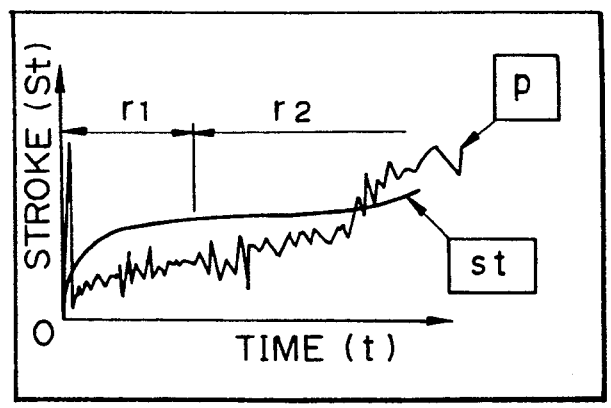
FIG. 6 is a schematic enlarged view of a command signal setter of the apparatus of FIG. 5, illustrating an example of a desired curve with respect to a stroke of the squeezing plunger versus an elapse of time.

As can be seen from FIG. 6, the desired curve of the stroke of the squeezing plunger 45 versus an elapse of time generally consists of a preceding region $r_1$ in which the squeezing plunger 45 is pressed relatively rapidly into the melt 46 (FIG. 5) in the die cavity 44, and a remaining region $r_2$ in which the squeezing plunger 45 is pressed relatively slowly into the melt 46 in the die cavity 44. Therefore, in the preceding region $r_1$ including an initial accelerating region, the squeezing plunger 45 must be pressed under a high pressure for only a moment, to be able to copy the initial accelerating region of the desired curve. Accordingly, to satisfy this requirement and to obtain a rapid response of the movement of the squeezing plunger 45, no limiting pressure is applied to the pressure of the pressurized liquid supplied to the pressurizing cylinder 1. Conversely, in the second region $r_2$, since the squeezing plunger 45 is relatively slowly moved, but constantly requires a high pressure, the limiting pressure is applied to prevent an occurrence of the seizure of the squeezing plunger 45 due to the high pressure.

FIGS. 8A through 8C are graphs showing the relationship between the practically measured pressure P (the ordinate) of the pressurized liquid supplied to the fluid-operated cylinder 1 and an elapse of time "t" (the abscissa) at three stages of a number of casting cycles when the control method and apparatus of the embodiment of FIGS. 5 through 7 are adopted. Note; the number of the casting cycles is increased from the graph of FIG. 8A to that of FIG. 8C, and since the frictional resistance against the sliding of the squeezing plunger 45 in the bore of the upper casting die 41 became larger in response to an increase in the number of the casting cycles, the pressure P necessary to enable the squeezing plunger 45 to copy the desired stroke St derived from the programmed desired curve gradually increased. In FIG. 8C, the pressure level designated by an arrow "A" indicates a pressure level corresponding to the predetermined limiting pressure set for preventing the occurrence of a seizure of the squeezing plunger 45 at a final stage of one casting cycle.

In accordance with the above-described embodiment of the present invention, such an additional advantage is obtained that, when the number or frequency that the output vo from the gate 15 is replaced by the limiting pressure vss or the length of time to cause such frequent replacements is appropriately measured during the casting cycles, it is possible to generate a signal warning that the frictional resistance is increased above a predetermined permissible level, on the basis of the measurement.

Additionally, when the feedback control unit 11 of the present embodiment is adopted for controlling the operation of an injecting cylinder operating an injecting plunger of, e.g, a die casting machine and an injection molding machine, it is possible to set a predetermined appropriate limiting pressure to an injecting pressure before completion of the injection of the molten substance into a die cavity by the injecting plunger, and thereby maintain the injecting pressure level at a suitable level to prevent a generation of a flash due to an excess metal or plastics forced between the mated dies.

Figures 9, 9A:
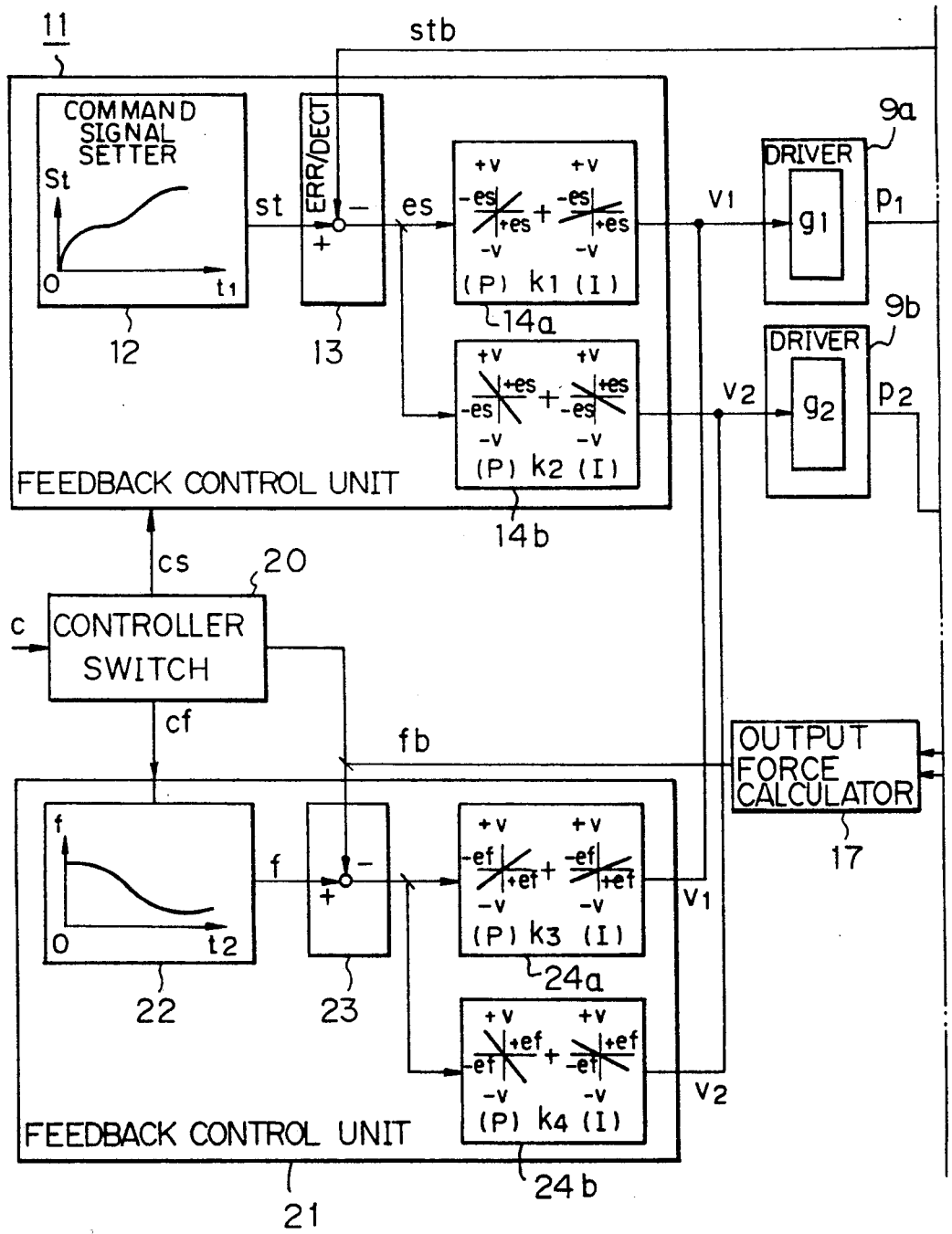
FIG. 9A is a block diagram of a controlling apparatus for controlling a fluid-operated cylinder, according to another embodiment of the present invention.
Figure 9B:
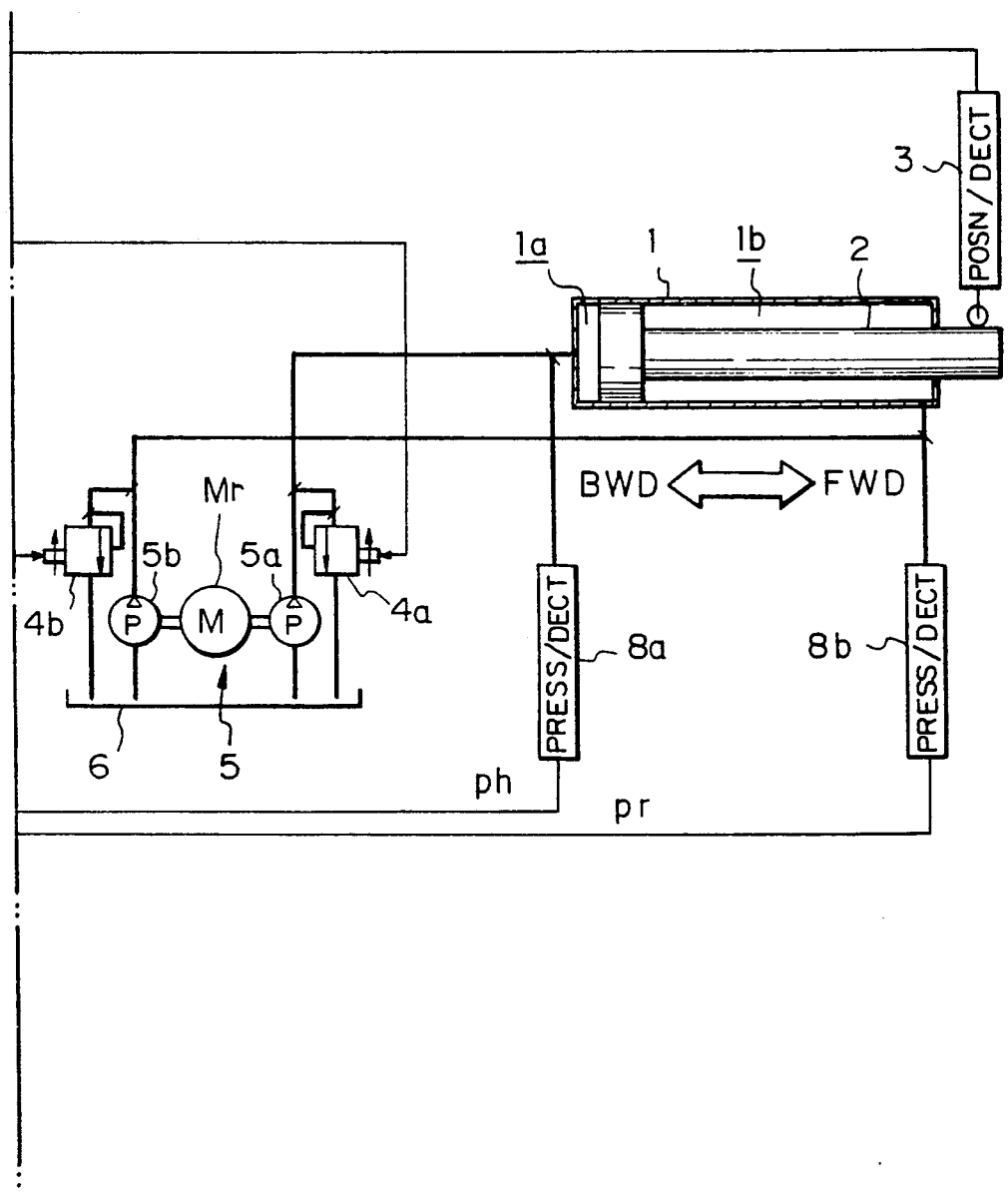
FIG. 9B is a schematic of the squeeze cylinder.

FIG. 9 illustrates a further embodiment of a control method and apparatus for a fluid-operated cylinder to be used as an actuator of a hydraulic machine, especially die casting or injection molding machines. In accordance with the present embodiment, the control method is characterized by controlling not only the stroke of the fluid-operated cylinder but also the output force exerted by a piston element thereof, whereby when the fluid-operated cylinder is used for injecting a substance to be cast or mold in a die or mold cavity as well as for pressurizing the injected substance, it is possible to precisely and elaborately control the injecting and squeezing processes to thereby obtain accurate cast or molded products.

Referring to FIG. 9, the fluid-operated cylinder 1 includes a slidably arranged piston element 2, and head and rod chambers 1a and 1b which are connected to respective hydraulic pumps 5a and 5b of the hydraulic power source 5 via individual hydraulic circuits including solenoid-operated automatic pressure regulating valves 4a and 4b, respectively, constituted by automatic pressure relief valves 4a and 4b similar to the pressure relief valve 4 of the embodiment of FIG. 1. The hydraulic power source 5 is provided with the above-mentioned independent hydraulic pumps 5a and 5b driven by a common drive motor Mr, and a fluid tank 6. The pressures of the pressurized liquid from respective hydraulic pumps 5a and 5b to the head and rod chambers 1a and 1b of the fluid-operated cylinder 1 are independently regulated to a necessary pressure level in response to signals input to the solenoid-operated automatic pressure regulating valves 4a and 4b. For example, when the pressure of the pressurized liquid supplied to the head chamber 1a from the hydraulic pump 5a is raised by the pressure regulating valve 4a, and simultaneously, when the pressurized liquid from the hydraulic pump from 5b as well as that in the rod chamber 1b are relieve via the pressure relief valve 4b into the fluid tank 6, the piston element 2 of the fluid-operated cylinder 1 is moved in a forward direction (FWD in FIG. 9). Conversely, when the pressure of the pressurized liquid supplied to the rod chamber 16 from the hydraulic pump 5b is raised, and that in the head chamber 1a is relieved via the pressure relief valve 4a into the oil tank 6, the piston element 2 is moved in a backward direction (BWD in FIG. 9). The movement of the piston element 2, i.e., an extended position or a stroke of the piston element 2 from the most retracted position of the piston element in the BWD direction is detected by a position detector 3 similar to that in the embodiment of FIG. 1. Namely, an electric signal "stb" indicating the detected position of the piston element 2 is output by the position detector 3. The pressures in the head and rod chambers 1a and 1b are detected by pressure detectors 8a and 8b, respectively, and corresponding electric signals "ph" and "pr" are output by these pressure detectors 8a and 8b. The detected pressure indicative signals "ph" and "pr" are input to an output force calculator 17 which calculates an instantaneous output force of the fluid-operated cylinder 1 on the basis of both signals "ph" and "pr" and predesigned pressure receiving areas of the head and rod chambers 1a and 1b. Drivers 9a and 9b are provided for respectively generating drive signals $P_1$ and $P_2$ for the afore-mentioned solenoid-operated pressure relief valves 4a and 4b upon receipt of later-described input signals $V_1$ and $V_2$, respectively.

In the present embodiment, first and second feedback control units 11 and 21 are provided to control the operation of the above-mentioned fluid-operated cylinder 1. These first and second feedback control units 11 and 21 have substantially the same function, and therefore, corresponding functional means, i.e., command signal setters 12 and 22, error detectors 13 and 23, first gain controllers 14a and 24a, and second gain controllers 14b and 24b carry out similar operations, respectively. The primary difference between both units 11 and 21 are in that the command signal setter 12 stores therein a programmed desired curve of the desired stroke of the fluid-operated cylinder 1 versus an elapse of time, but the signal command setter 22 stores therein a programmed desired curve of the desired output force of the fluid-operated cylinder 1 versus an elapse of time as can be seen in FIG. 9. Also, although the error detector 13 of the first feedback control unit 11 receives the position indicative signal "stb", the error detector 23 of the second feedback control unit 21 receives and output force indicative signal "fb" supplied by the above-mentioned output force calculator 17. It should be further noted that the gains of the gain controllers 14a, 14b, 24a and 24b are different as required, and therefore, are designated by $K_1$, $K_2$, $K_3$, and $K_4$ in FIG. 9.

Both feedback control units 11 and 21 are constituted by a microcomputer or a personal computer, respectively. Alternatively, both units 11 and 21 may be constituted by a single microcomputer or personal computer, as required.

A controller switch 20 is arranged between the first and second feedback control units 11 and 21 to selectively operate one of the feedback control units 11 and 21, in a manner described later.

The operation of the present embodiment of FIG. 9 will be given below.

Figure 10A:
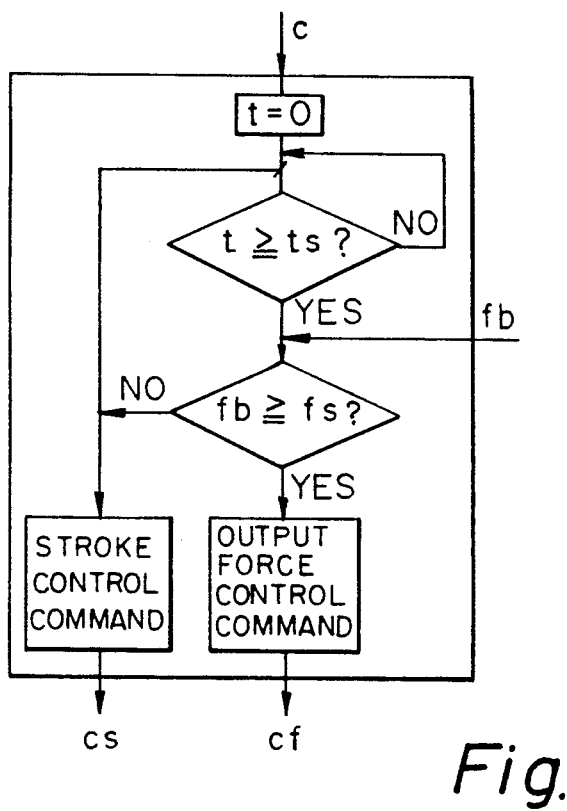
FIG. 10A is a schematic view of a controller switch of the apparatus of FIG. 9, illustrating the programmed operation of the controller switch according to the present invention.

When a not shown controller generates a command signal "c" for starting the operation of the fluid-operated cylinder 1, the command signal "c" is given to the controller switch 20. The controller switch 20 then carries out a preliminarily programmed operation as shown in FIG. 10A. Namely, at the time of receiving the command signal "c" (t=0), the controller switch 20 starts a counting operation, and sends a stroke control command signal "cs" to the first feedback control unit 11 operable for controlling the stroke of the fluid-operated cylinder 1 until a predetermined interval "ts". In accordance with the signal "cs", the command setter 12 of the first feedback control unit 11 outputs the desired stroke of the piston element 2 of the fluid-operated cylinder 1, derived from the programmed desired curve (st versus $t_1$ in FIG. 9) in a time division manner at a frequency of fractions of one thousand milliseconds. The desired stroke signals from the command signal setter 12 are input to the subsequent error detector 13. At this stage, the time $t_1$ starts from the time receiving the stroke control command signal "cs", and an extent of the desired stroke of the piston element 2 is programmed by selecting the most retracted position of the piston element 2 at "0", and denoting a movement in the FWD direction as a positive (+) movement (therefore, movement in the BWD direction is a negative (−) movement.) In the error detector 13, a comparison between the desired stroke and the actual stroke of the position element 2 is carried out to find out an error "es" (es=st−stb) to be input to the gain controllers 14a and 14b, respectively. Then both gain controllers 14a and 14b convert the error signal "es" input by the error detector 13 into respective feedback signals $V_1$ and $V_2$ indicating pressures to be supplied from the respective hydraulic pumps 5a and 5b to the head and rod chambers 1a and 1b to compensate for the difference between the desired and actual strokes of the piston element 2 of the fluid-operated cylinder 1. When the converting operation of both gain controllers 14a and 14b are made by multiplying respective control gains (PI gains $K_1$ and $K_2$) to the value of the error "es". The gains $K_1$ and $K_2$ are predetermined so that a rapid and stable movement of the piston element 2 is accomplished during copying of the desired curve of the command signal setter 12 as described before with reference to the embodiment of FIG. 3. The feedback signals $V_1$ and $V_2$ are then input by the gain controllers 14a and 14b of the first feedback control unit 11 into respective drivers 9a and 9b which generate electric drive signals $P_1$ and $P_2$, respectively, to independently regulate the pressures in the head and rod chambers 1a and 1b of the fluid-operated cylinder 1 via the energization of the automatic pressure relief valves 4a and 4b, respectively. For example, during the stroke of the piston element 2 in the FWD direction, when the error "es" is positive, i.e., when the actual stroke "stb" of the piston element 2 is less than the desired stoke "st" of the piston element 2, the pressure control of the head and rod chambers 1a and 1b is carried out by the feedback control unit 11 in such a manner that an additional forward movement of the piston element 2 for accurately and rapidly compensating for the positive error "es" occurs (in the present embodiment, the pressure in the head chamber 1a is raised and the pressure in the rod chamber 1b is correspondingly lowered). Conversely, when the error "es" is negative during the stroke of the piston element 2 in the FWD direction, the feedback control unit 11 controls the pressures of the head and rod chambers 1a and 1b of the fluid-operated cylinder 1 so that the piston element 2 is moved in the BWD direction, i.e., in the direction to be retracted into the cylinder body until the error is compensated (the pressure in the rod chamber 1b is raised, and the pressure in the head chamber 1a is correspondingly lowered).

Referring again to FIG. 10A, when a predetermined time "ts" from the time "0" has passed, the controller switch 20 starts detecting the output force of the fluid-operated cylinder 1 via the pressure detectors 8a and 8b, and the output force calculator 17. Namely, before the actual output force indicated by the signal "fb" reaches a value corresponding to a predetermined output force "fs", the controller switch 20 allows the first feedback control unit 11 to control the above-mentioned stroke of the fluid-operated cylinder 1. When the signal "fb" becomes equal to or larger than the signal "fs", the controller switch 20 stops the operation of the first feedback control unit 11, and sends an operation command signal "cf" to the second feedback control unit 21; i.e., the switching of the operation from the first feedback control unit 11 to the second feedback control unit 21 is made by the controller switch 20. At this stage, the above-mentioned signal "fs" is, for example, a signal indicating an output force of the fluid-operated cylinder 1 when the injection of the cast or molded substance into a die cavity is completed in a case where the fluid-operated cylinder 1 is used for, e.g., an actuator of an injecting plunger of a die casting machine.

As can be see from FIG. 9, the command signal setter 22 of the second feedback control unit 21 stores therein a programmed desired curve of the desired output force "f" versus an elapse of time "t2" (t2=0 when the unit 21 receives the operation command signal "cf"), and outputs a signal "f" indicating a desired output force of the piston element 2 of the fluid-operated cylinder 1 derived from the programmed desired curve in a time division manner at a frequency of fractions of one thousand millisecond after receiving the operation command signal "cf". The output signal "f" is input to the error detector 23. At this stage, when the piston element 2 receives forces on both sides thereof which are mutually balanced, the output signal "f" is 0, and a force moving the piston element 2 in the FWD direction is larger than that moving the piston element 2 in the BWD direction, the signal "f" is denoted by, e.g., a positive sign (+), and is accordingly denoted by a negative sign (−) when the force moving the piston element 2 in the FWD direction is less than that moving the piston element 2 in the BWD direction.

In the error detector 23, a comparison between the desired and actual output forces of the piston element 2 is carried out to find out an error "ef" (ef=f−fb) to be input to the gain controllers 24a and 24b, respectively. Then both gain controllers 24a and 24b convert the error signal "ef" input by the error detector 23 into respective feedback signals $V_1$ and $V_2$ indicating pressures to be supplied from the respective hydraulic pumps 5a and 5b to the head and rod chambers 1a and 1b to compensate for the error "ef" between the desired and actual output forces of the piston element 2 of the fluid-operated cylinder 1. When the converting operation of both gain controllers 24a and 24b are made by multiplying respective control gains (PI gains $K_3$ and $K_4$) to the value of the error "ef". The gains $K_3$ and $K_4$ are predetermined so that a rapid and stable response characteristic in a movement of the piston element 2 is accomplished during copying of the desired curve of the command signal setter 22. The feedback signals $V_1$ and $V_2$ are then input by the gain controllers 24a and 24b of the second feedback control unit 21 into respective drivers 9a and 9b which generate electric drive signals $P_1$ and $P_2$, respectively, to independently regulate the pressures in the head and rod chambers 1a and 1b of the fluid-operated cylinder 1 via the energization of the automatic pressure relief valves 4a and 4b, respectively.

For example, during the exerting of an output force of the piston element 2 in the FWD direction, when the error "es" is positive, i.e., when the actual output force "fb" of the piston element 2 is less than the desired output force "f" of the piston element 2, the pressure control of the head and rod chambers 1a and 1b is carried out by the feedback control unit 21 in such a manner that an additional exertion of an output force of the piston element 2 for accurately and rapidly compensating for the positive error "ef" occurs (in the present embodiment, the pressure in the head chamber 1a is raised, and the pressure in the rod chamber 1b is correspondingly lowered). Conversely, when the error "ef" is negative during exerting of an output force of the piston element 2 in the FWD direction, the feedback control unit 21 controls the pressures of the head and rod chambers 1a and 1b of the fluid-operated cylinder 1 so that the piston element 2 lowers an output force in the FWD direction in response to an extent of the error "ef" until the actual output force of the fluid-operated cylinder 1 copies the desired output force programmed in the command signal setter 22.

Figure 10B:
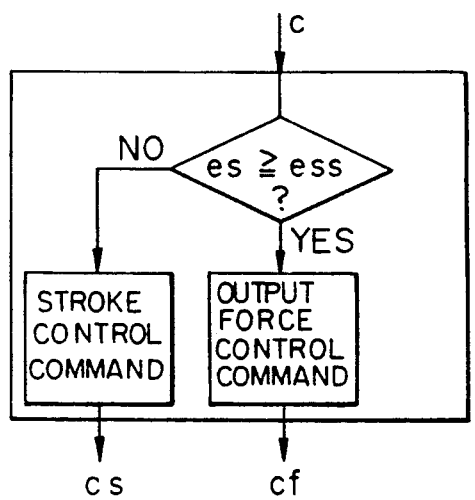
FIG. 10B is a modified embodiment of the controller switch of FIG. 10A.
Figure 12:
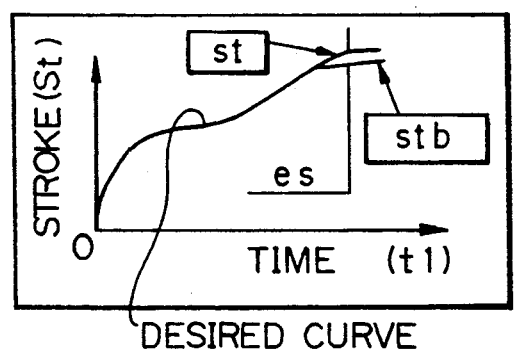
FIG. 12 is a schematic view of a command signal setter of a feedback control unit of FIG. 9 or FIG. 11, illustrating another example of a desired curve with respect to a stroke of the squeezing plunger versus an elapse of time.

The above-mentioned controller switch 20 may be constructed to have a modified function as illustrated in FIGS. 10B and 12. In the afore-mentioned embodiment of FIGS. 10A, the switching of the operation of the first feedback control unit 11 to that of the second feedback control unit 21 is carried out after the predetermined elapse of time "ts". Nevertheless, in the modified embodiment of FIGS. 10B and 12, the switching of the operation of the first feedback control unit 11 to that of the second feedback control unit 21 is carried out based on the error "es" between the desired and actual strokes "st" and "stb" of the piston element 2 of the fluid-operated cylinder 1.

When the fluid-operated cylinder 1 is used as, for example, an injecting cylinder, and when the desired curve of the stroke (st) of the piston element 2 of the fluid-operated cylinder 1 versus an elapse of time ($t_1$) is programmed to be a gradually climbing curve as shown in FIG. 12, the output force of the fluid-operated cylinder 1 is not able to follow an increase in a load to the cylinder 1 at the final stage of the injecting process, and as a result, the error "es" is gradually accumulated. Therefore, when the controller switch 20 detects that this accumulation of the error "es" becomes equal to or larger than a predetermined amount of error "ess", the controller switch 20 generates the signal "cf" to operate the second feedback control unit 21 while stopping the operation of the first feedback control unit 11 as illustrated in FIG. 10B.

The above-mentioned feedback control of the fluid-operated cylinder 1 by using the first and second feedback control units 11 and 21 and the controller switch 20 may be effectively adopted for various fluid-operated cylinders, such as fluid-operated cylinders for a die casting machine, an injection molding machine, and an extrusion machine using extruding dies. A typical example of such an application will be described in the following embodiment in which the fluid-operated cylinder is used for operating a squeezing plunger of a die casting machine.

Figures 11, 11A:
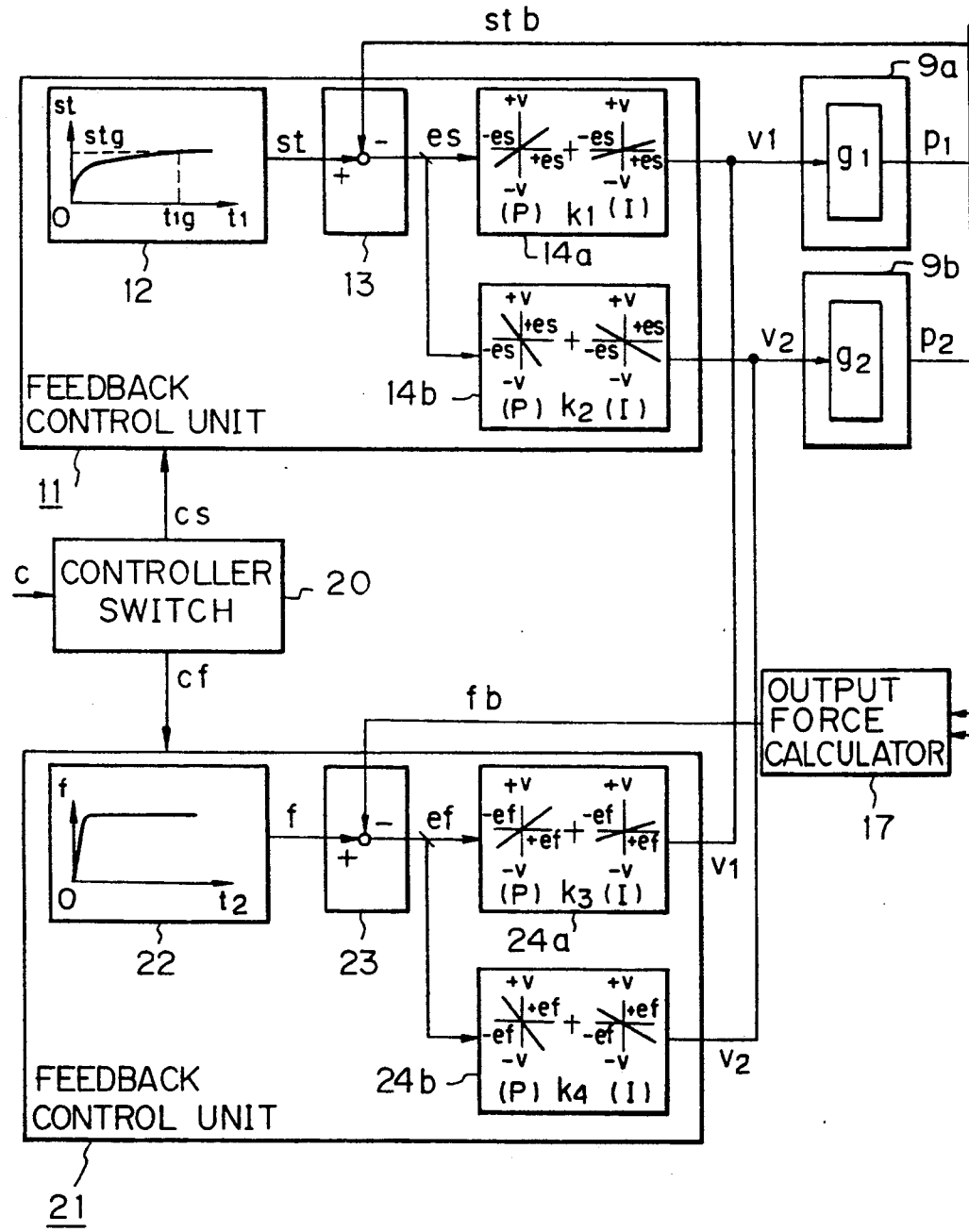
FIG. 11A is a block diagram of an apparatus for controlling the operation of a die casting machine according to a further embodiment of the present invention.
Figure 11B:
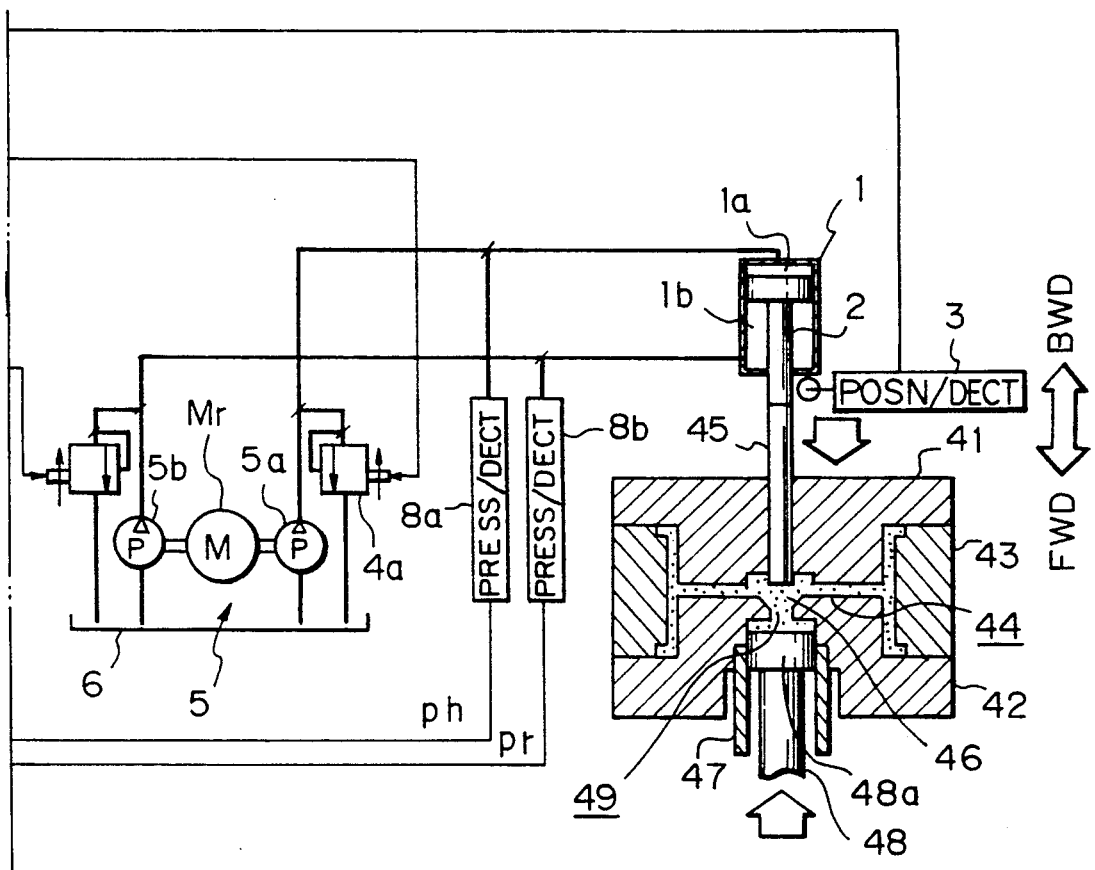
FIG. 11B is a schematic of the squeeze cylinder.

FIG. 11 illustrates an embodiment of the present invention in which the fluid-operated cylinder 1 is used for operating squeezing plunger of a die casting machine for imposing a squeeze pressure on a cast substance, i.e., a melt, after completion of the injecting process of the substance into a die cavity. Since the die casting machine per se is similar to that of the embodiment of FIG. 1, the description of the construction and operation of the die casting machine is not provided here. It should be further noted that first and second feedback control units 11 and 21 of the present embodiment are substantially the same as those of the embodiment of FIG. 9, except that the desired curves of the desired stroke and output force of the piston element 2 of the fluid-operated cylinder 1 are different from those of FIG. 9, to comply with a requirement for the squeeze pressure applying operation of the squeezing plunger 45.

Figure 10C:
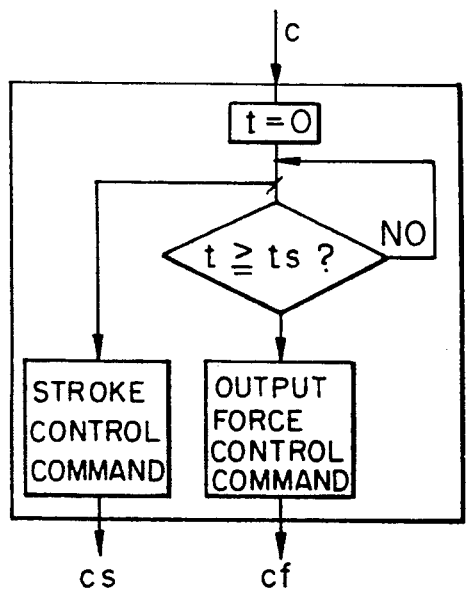
FIG. 10C is a schematic view of a controller switch of an apparatus of FIG. 11, illustrating the programmed operation of the controller switch according to the present invention.

In the present embodiment, the controller switch 20 carries out the switching operation in accordance with a predetermined program illustrated in FIG. 10C.

When the not illustrated controller similar to the host controller HC of the embodiment of FIG. 1 sends an operation command signal "c" commanding the start of the operation of the fluid-operated cylinder 1, i.e., the pressurizing cylinder, to the controller switch 20, the controller switch 20 starts to count time (when receiving the operation command signal "c", t=0). Before the counted time reaches a predetermined time "ts", the controller switch 20 sends a stroke control command signal "cs" to the first feedback control unit 11 to thereby operate the unit 11. Thus, the feedback control unit 11 performs the feedback control of the actual stroke of the pressurizing cylinder 1 in accordance with a desired curve of the desired stroke (st) versus an elapse of time ($t_1$). This control operation is similar to that carried out by the embodiment of FIG. 9.

When the predetermined time "ts" has elapsed ($t \geq ts$), the controller switch 20 stops the operation of the feedback control unit 11, and sends an output force control command signal "cf" to the second feedback control unit 21 to operate the unit 21. Therefore, the second feedback control unit 21 performs the feedback control of the actual output force of the pressurizing cylinder 1, and in turn, the actual output force of the squeezing plunger 45 in accordance with a desired curve of the desired output force (f) of the cylinder 1 versus an elapse of time ($t_2$). At this stage, it should be understood that the above-mentioned predetermined time "ts" is selected in such manner that the feedback control of the actual output force of the squeezing plunger 45 is started slightly prior to a time "$t_{1g}$" at which the actual stroke of the squeezing plunger 45 reaches a predetermined desired stroke "stg", i.e., the position for sealing the gate 49 of the die cavity 44. Alternatively, the predetermined time "ts" may be selected by taking into account an actual amount of the stroke of the squeezing plunger 45 which is capable of compensating a shrinkage of the cast or molded substance, i.e., the melt 46 in the die cavity 44, or a time interval necessary for carrying out that actual amount of the stroke of the squeezing plunger 45. This is because the shrinkage of the melt 46 depends on the volume and entire surface area of the die cavity 44, the cooling characteristics of the upper, lower dies 41, 42, and the cores 43.

It should be further noted that the desired output force "f" of the desired curve programmed in the command signal setter 22 of the second feedback control unit 21 is determined so that the squeezing plunger 45 is certainly brought to the gate sealing position in the final stage of applying the squeeze pressure to the melt 46 in the cavity 44 by exerting the maximum output force thereof for a short time just prior to the completion of the squeeze pressure applying process.

At the final stage of the squeeze pressure applying process, when a not shown appropriate detector detects that the squeezing plunger 45 has moved to the gate sealing position, the operation command signal "c" from the host controller (not shown) to the controller switch 20 is stopped, and the entire operation of the first and second feedback control units 11 and 21 is completed. This method of feedback control of the pressurizing cylinder 1, and in turn the squeezing plunger 45, contributes to an accurate movement of the squeezing plunger 45 to the gate sealing position for a controlled short period of time. Consequently, it is ensured that an elaborative casting process of the melt for obtaining precise cast products is accurately accomplished.

The above-mentioned switching of the operation from the first to second feedback control units may be changed to various switching methods, for example, to a method of switching from the second to the first feedback control unit.

Figure 13A:
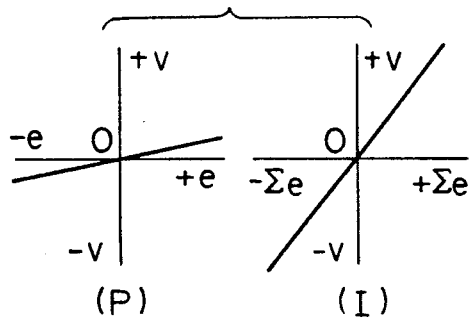
FIGS. 13A and 13B are explanatory views illustrating an integration gain and proportional gain applied by a gain controller employed for the apparatus according to the present invention.
Figure 13B:
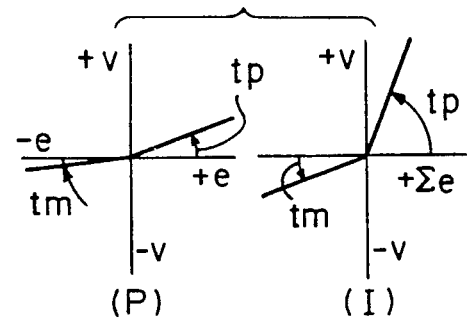

FIGS. 13A and 13B illustrate the graphs of particular PI gain characteristics of the gain controllers 14, 14a, and 14b of the feedback control unit 11 for controlling the stroke of the piston element 2 of the fluid operated cylinder 1 or the squeezing plunger 5 connected to the pressurizing cylinder 1 in the described embodiments of the present invention.

Figure 14A:
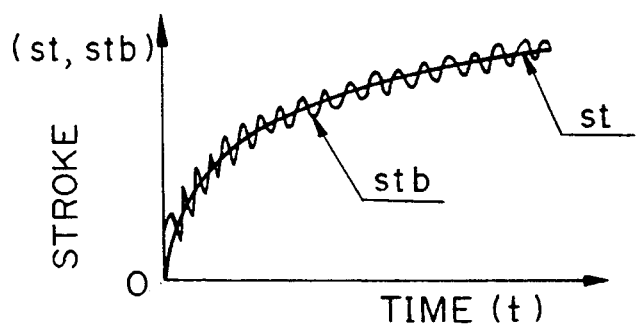
FIGS. 14A and 14B are graphical views illustrating an operation of a sliding piston of a fluid-operated cylinder to copy a desired curve with respect to a stroke of the sliding piston versus an elapse of time.
Figure 15A:
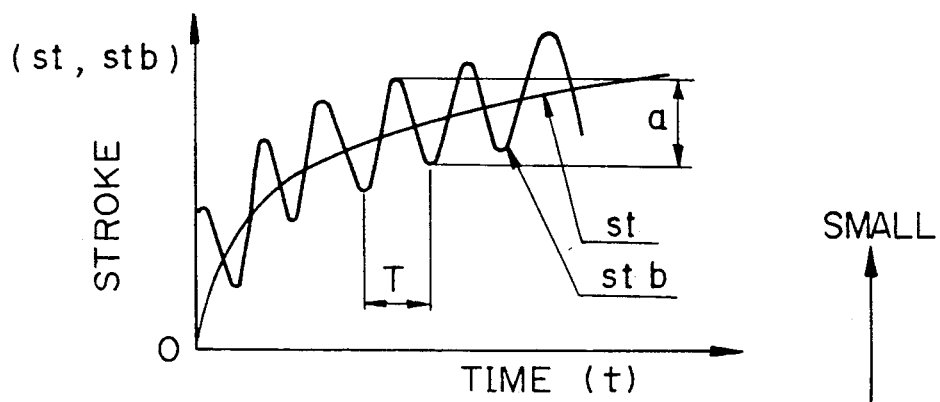
FIGS. 15A and 15B are graphical views similar to FIGS. 13A and 13B, illustrating a difference in operation of the sliding piston due to a difference in an extent of a control gain.
Figure 15B:
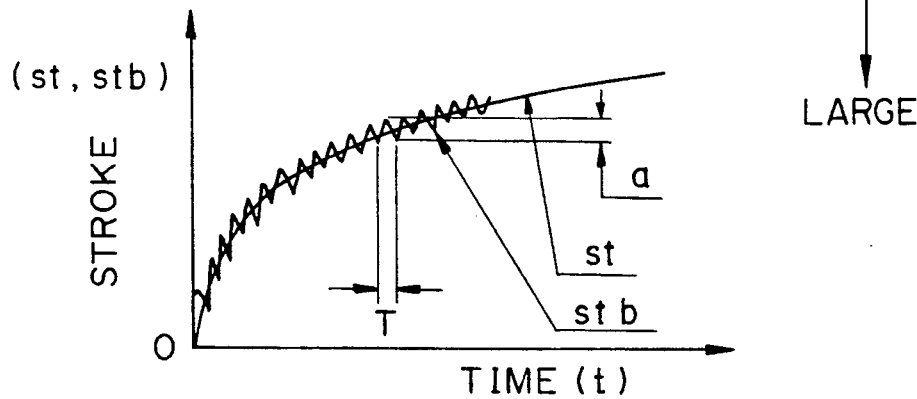

For example, with respect to the first embodiment of FIG. 1, when the gain controller 14 of the feedback control unit 1 has a PI gain control characteristic illustrated in FIG. 13A, the gain controller 14 multiplies a PI gain "K" to the stroke error between the desired and actual strokes of the squeezing plunger 45 to generate the feedback signal "Pc" to be input to the driver 9. At this stage, since the gain "K" consists of a proportional gain "P" illustrated on the left half of the graph of FIG. 13A plus an integral gain "I" illustrated on the right half of the graph of FIG. 13A, and having an inclination larger than that of "P" gain, the feedback control of the stroke of the squeezing plunger 45 is carried out in such a manner that the pressure regulation of the solenoid-operated automatic pressure regulating valve or pressure relief valve 4 is implemented in relation to an amount of accumulation of the actual stroke error "e" or "$\Delta St$" of the squeezing plunger 5 or the piston element 2 of the pressurizing cylinder 1 rather than the actual stroke error "e" per se. Therefore, the actual stoke of the squeezing plunger 45 copies the desired curve of the desired stroke versus an elapse of time stored or programmed in the command signal setter in the manner as shown in FIG. 14A. Namely, the actual stroke of the squeezing plunger 45 includes a vibratory movement therein against the smooth desired curve. This is because the pressure regulation of the pressurized liquid supplied from the hydraulic power source 5 to the head and rod chambers 1a and 1b of the pressurizing cylinder 1 by the pressure relief valve 4 is carried out in relation to the amount of accumulation of the error "e" by an effect of the "I" gain stronger than the "P" gain. Particularly, when the "P" gain is set to approximately zero, the vibratory motion of the squeezing plunger 45 vividly appears and can be adjusted by changing the value of the "I" gain as illustrated in FIGS. 15A and 15B. Namely, when the "I" gain is small, the frequency "f" of the vibratory movement of the squeezing plunger 45 becomes small (i.e., the cyclic time "T" becomes large) as can be seen from FIG. 15A. Conversely, when the "I" gain is large, the frequency "f" of the vibratory motion of the squeezing plunger becomes large (i.e., the cyclic time "T" becomes small) as can be seen from FIG. 15B.

Figure 14B:
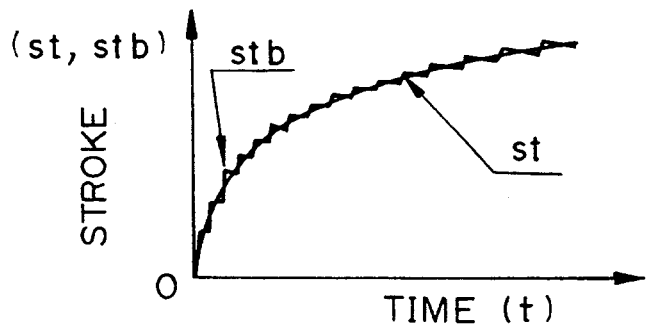

FIG. 3B illustrates another gain characteristic of the gain controller 14 in which a gain K contributing to the stroke of the piston element 2 or the squeezing plunger 45 in a direction extended from the most retracted position (FWD direction) is relatively larger than a gain K contributing to the stroke of the piston element 2 or the squeezing plunger 45 in a direction toward the retracted position (BWD direction). Namely, an inclination "tp" of the gain K during the positive stroke error "e" (=st−stb) is set larger than an inclination "tm" of the gain K during the negative stroke error "e" as can be understood from the graphical illustration of FIG. 13B. As a result, the actual movement of the piston element 2 or the squeezing plunger 45 exhibits a high response characteristic in the movement in the FWD direction compared with that in the movement in the BWD direction. Accordingly, as can be seen from the graphical illustration of FIG. 14B, the actual stroke of the piston element 2 or the squeezing plunger 45 with respect to the desired curve has a characteristic such that the movement of the piston element 2 or the squeezing plunger 5 toward the desired stroke occurs very quick, but when the actual stoke exceeds the desired stroke, the movement of the piston element 2 or the squeezing plunger 45 back to the desired stroke is very slow, and therefore, the entire actual movement of the piston element 2 or the squeezing plunger 45 takes a step wise curve with respect to the smooth desired curve as illustrated in FIG. 14B. This characteristic of the stroke of the piston element 2 or the squeezing plunger 45 can be used as a vibratory movement of the stroke of the squeezing plunger. In addition, when the "P" and "I" gains of the gain characteristics of FIG. 13B are changed, it is possible to adjust the vibratory characteristic of the movement of the piston element 2 or the squeezing plunger 5 in a similar manner to that of the embodiment of FIG. 13A.

The above-mentioned vibratory movement of the squeezing plunger 45 of the die casting machine can be brought about the advantages as set forth below.

(i) The melt in the die cavity 44 receives a vibratory squeeze pressure from the squeezing plunger 45, and therefore, a gas contained in the melt is automatically exhausted. Accordingly, a high quality cast product having no gas voids can be obtained.

(ii) When the molten substance comes into contact with the cooled casting dies, a thin solidified film or layer, referred to as a "chill layer", usually appears. Nevertheless, by the application of a vibration from the squeezing plunger to the molten substance, the generation of such a chill layer can be prevented. Accordingly, the molten substance is able to have an excellent flow characteristic in the die cavity. Consequently, during the squeezing process, a good transmission of the squeeze pressure is achieved, and the cast substance is finely crystallized when solidifying. Also, gross porosity in the cast product does not occur.

Figure 16:
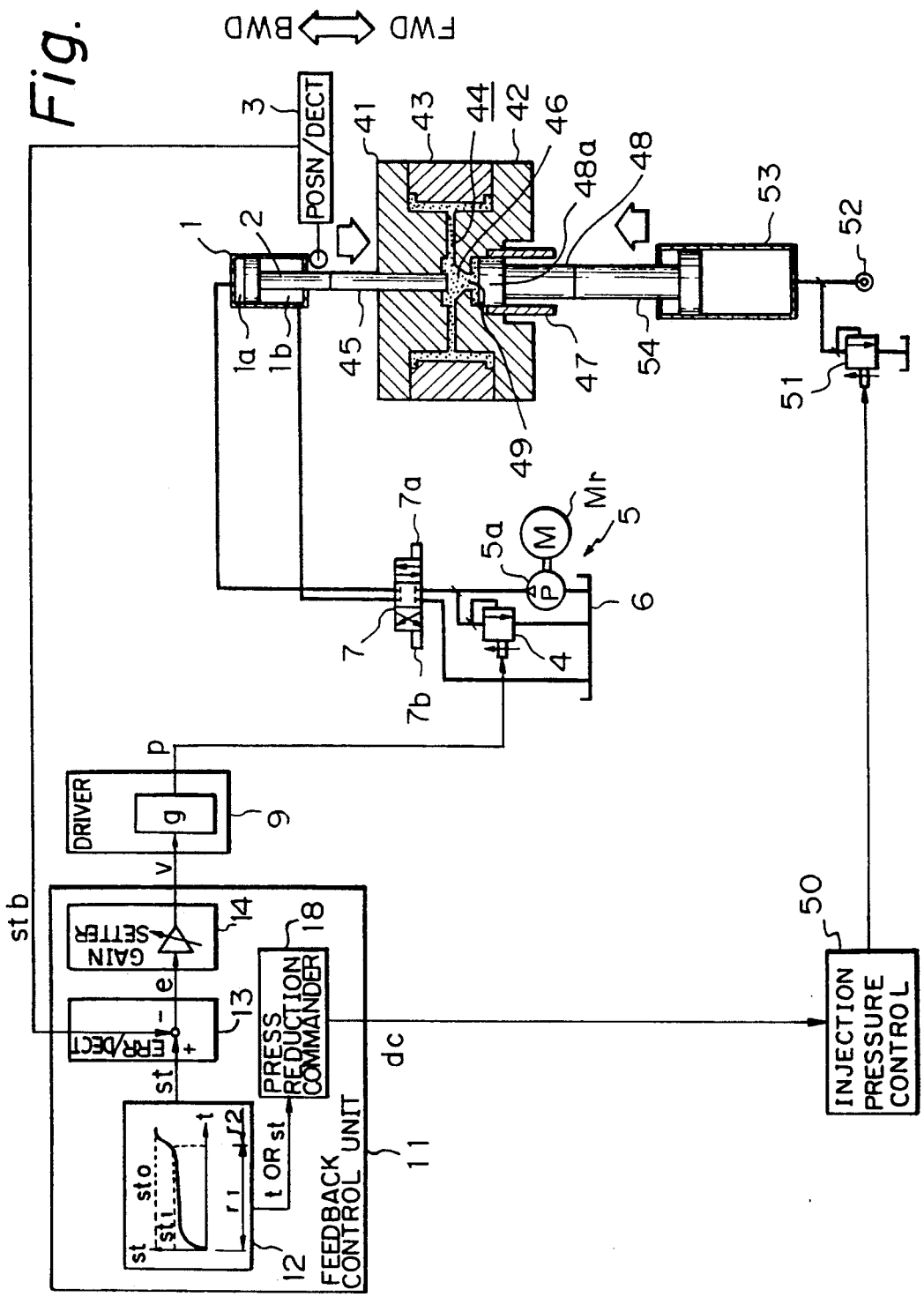
FIG. 16 is a block diagram of an apparatus for controlling the operation of a die casting machine according to a still further embodiment of the present invention.

FIG. 16 illustrates a modified embodiment of FIG. 1, in which the feedback control of tee injecting cylinder for a die casting machine is provided in addition to the afore-mentioned feedback control of the pressurizing cylinder at the final stage of the squeezing process.

The system of FIG. 16 is different from that of FIG. 1 in that the feedback control unit 11 includes therein a pressure reduction commander 18 operatively connected to the command signal setter 13, and that an injection pressure controller 50 and an additional solenoid-operated automatic pressure relief valve 51 for regulating a pressure of the pressurized liquid from a hydraulic power source 52 to an injection cylinder 53 are provided between the feedback control unit 11 and the injecting cylinder 53.

The basic operation of the feedback control unit 11 for controlling the stroke of the squeezing plunger 45 connected to the pressurizing cylinder 1 is the same as that of the embodiment of FIG. 1, and thus the description thereof is omitted here. The description of the feedback control of the injection cylinder 1 is given below with reference to FIGS. 16 through 18.

When a cast substance, i.e., a melt 46, is injected from inside the injection sleeve 47 into the die cavity 44 by the operation of the plunger tip 48a and the injecting plunger 48 connected to a piston element 54 of the injecting cylinder 53, the piston element 54 of the injecting plunger 53 is left at an injected position thereof illustrated in FIG. 16.

After completion of the injection of the melt 46 into the die cavity 44, the directional control valve 7 is moved to a position in which the flow of the pressurized liquid from the hydraulic power source 5 to the pressurizing cylinder 1 is switched to cause the stroke movement of the squeezing plunger 45 into the melt 46 filled in the die cavity 44, to thereby compensate for shrinkage of the melt 46 in the die cavity 44. The stroke movement of the squeezing plunger 45 is controlled to copy the desired curve (st versus t) programmed in the command signal setter 12 of the feedback control unit 11 in the manner described with reference to the embodiment of FIG. 1.

Figure 17:
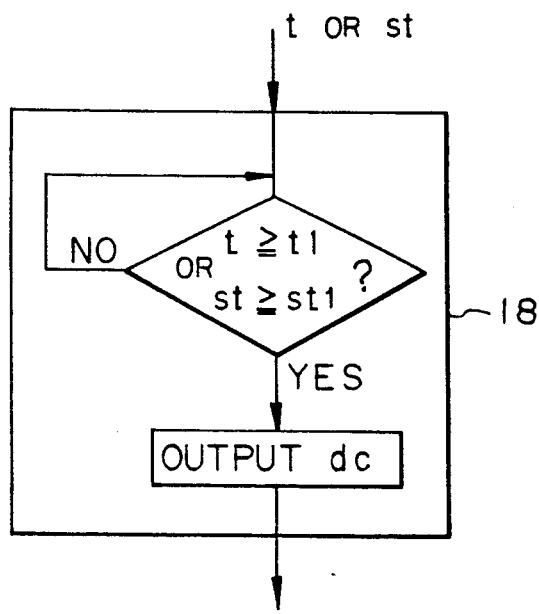
FIG. 17 is a schematic view of a pressure reduction commander of the apparatus of FIG. 16, illustrating the programmed operation of the pressure reduction commander according to the present invention.

When the feedback control of the stroke movement of the squeezing plunger 45 via the pressurizing cylinder 1 is carried out, the command signal setter 12 of the feedback control unit 11 outputs a time signal "t" or a stroke signal "st" derived therefrom to the pressure reduction commander 18. Then the pressure reduction commander 18 implements a predetermined programmed function as shown in FIG. 17. Namely, a discrimination of whether or not the time signal "t" or the stroke signal "st" is equal to or larger than a predetermined value "$t_1$" or "$st_1$" is made. The predetermined time "$t_1$" and the predetermined stroke "$st_1$" corresponds to boundary time and stroke of the squeezing plunger 45 between a first region $r_1$ in which the squeeze pressure is imposed on the melt 46 by the squeezing plunger 45 and a second region $r_2$ in which the squeezing plunger 45 is moved down to the gate sealing position "stg".

Figure 18:
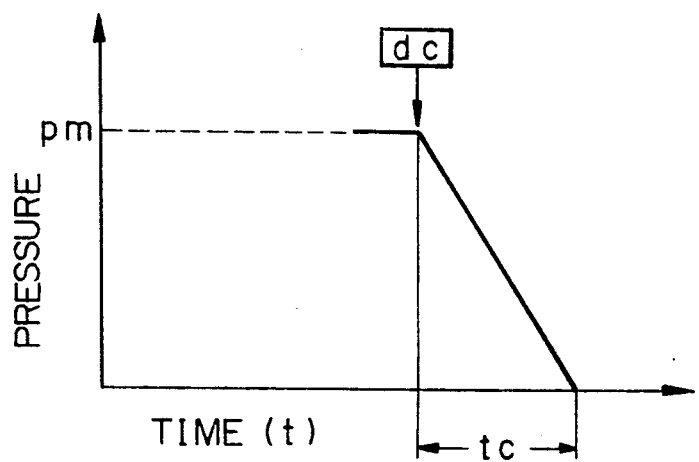
FIG. 18 is a graph illustrating a relationship between a pressure of an injecting cylinder and an elapse of time according to the embodiment of the present invention of FIG. 16.

When the result of the above-mentioned discrimination indicates "YES", a pressure reduction command "dc" is output from the pressure reduction commander 18 to the injection pressure controller 50, and therefore, the injection pressure controller 50 energizes the solenoid-operated automatic pressure relief valve 51 (i.e., the pressure regulating valve) to thereby gradually reduce an injection pressure "Pm" exerted by the injecting plunger 48 via the injecting cylinder 53. Namely, the reduction of the injection pressure is carried out in such a manner that, after a predetermined time "tc", the pressure level becomes nil as illustrated in FIG. 18. The predetermined time "tc" is selected to correspond to an interval necessary for the squeezing plunger 45 to reach the gate sealing position at which the gate 49 in the die cavity 44 is sealed by the end of the squeezing plunger 45. In practice, the time "tc" is selected as a few or more seconds. Thus, during the final stage of the squeeze pressure applying process, the injection pressure is reduced to comply with the stroke movement of the squeezing plunger to the gate sealing position, and accordingly, the squeezing plunger 45 can reach the gate sealing position. In addition, an effective melt pressing is imposed by the cooperation of the squeezing and injecting plungers 45 and 48. In the present embodiment, it should be understood that the pressure reduction commander 18 may be constituted by the CPU of the microcomputer or personal computer by which the feedback control unit 11 per se is constituted.

Figures 19, 20:
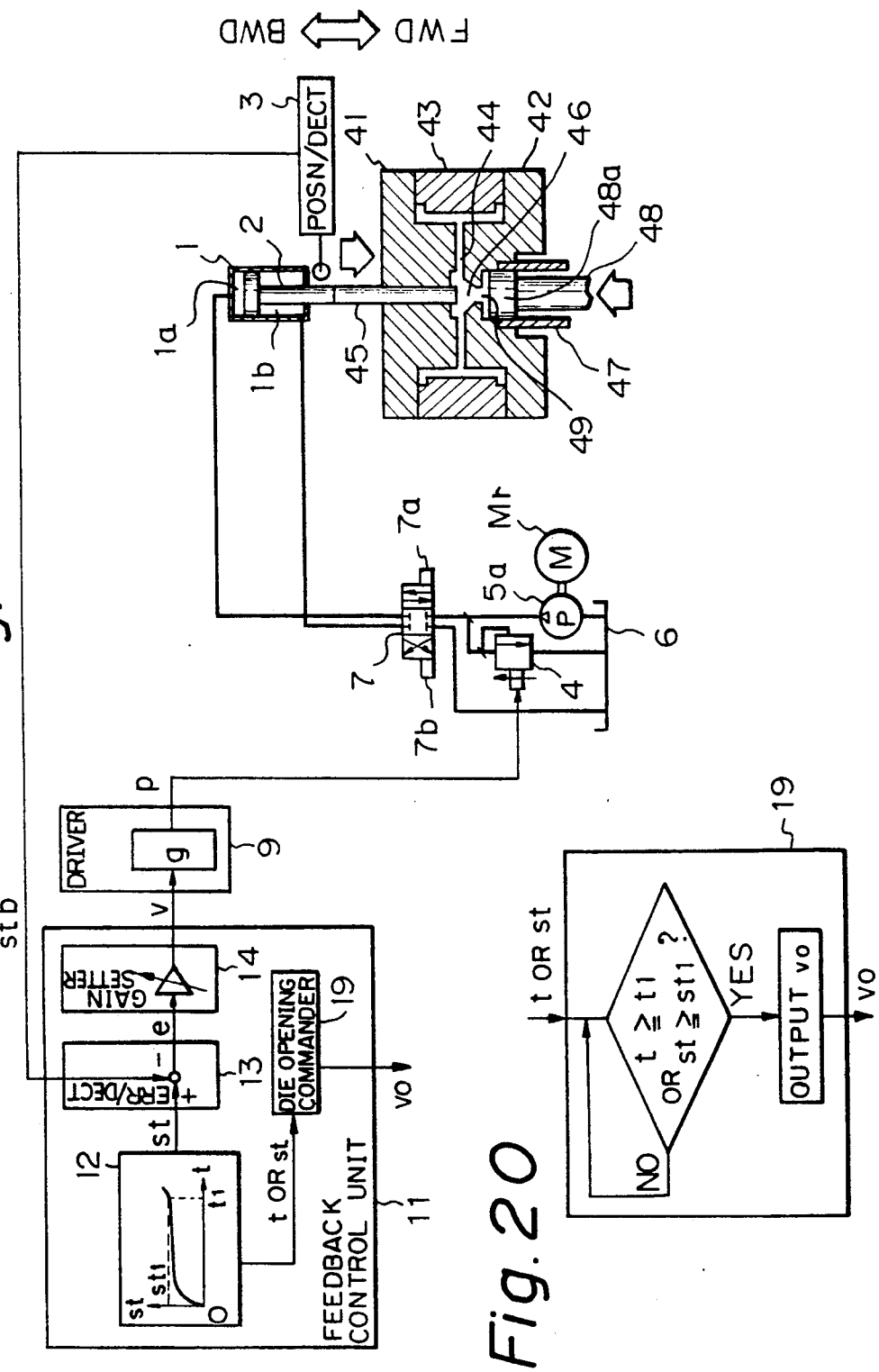
FIG. 19 is a block diagram of an apparatus for controlling the operation of a die casting machine according to a further embodiment of the present invention.
FIG. 20 is a schematic view of a die opening commander of the apparatus of FIG. 19, illustrating the programmed operation of the die opening commander.
Figure 22:
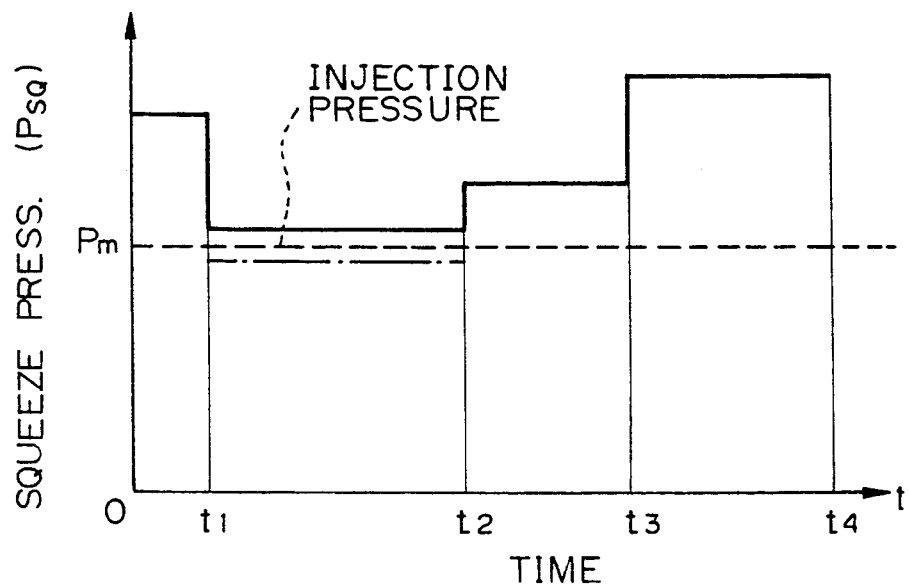
FIG. 22 is a diagram illustrating a relationship between a squeeze pressure and an elapse of time according to the prior art.
Figure 23:
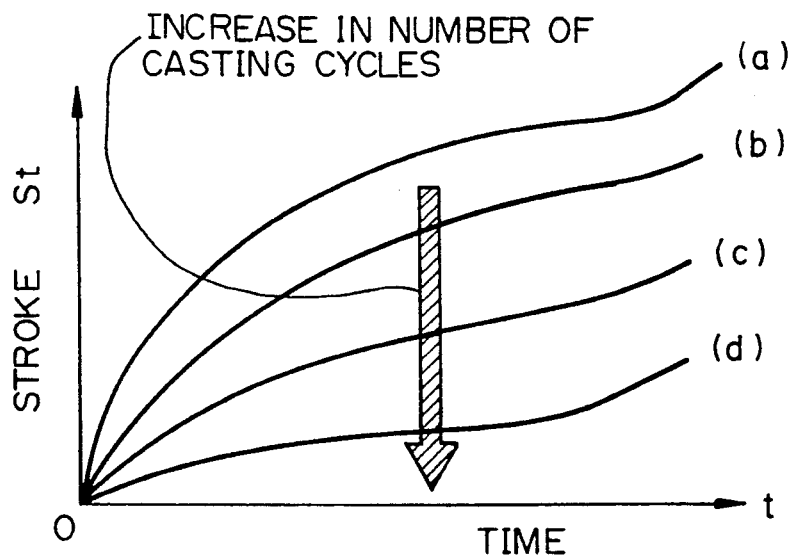
FIG. 23 is a graphical view illustrating how a relationship between a stroke of the squeezing plunger and an elapse of time changes in response to an increase in a number of casting cycles according to the prior art.

FIG. 19 illustrates a further modified embodiment of that of FIG. 1, in which an opening of the dies of a die casting machine is controlled by a feedback control unit 11.

The feedback control unit 11 of FIG. 19 is different from that of the embodiment of FIG. 1 in that a die opening commander 19 connected to the command signal setter 12 is provided for sending a command signal "Vo" to the die casting machine in response to a time signal "t" or a desired stroke signal "st" derived from the desired curve of the desired stroke of the squeezing plunger 45 of the die casting machine versus an elapse of time. The die opening commander 19 is provided with a predetermined programmed function to discriminate whether or not the time signal "t" or the stroke signal "st" reaches a predetermined time value "$t_1$" or a predetermined stroke value "st" as illustrated in FIG. 20. Therefore, the die opening commander 19 may be constituted by the CPU of the microcomputer or the personal computer by which the feedback control unit 11 is constituted.

When the feedback control of the stroke movement of the squeezing plunger 45 via the pressurizing cylinder 1 is carried out, the command signal setter 12 of the feedback control unit 11 outputs a time signal "t" or a stroke signal "st" derived therefrom to the die opening commander 19. Then the die opening commander 19 implements predetermined programmed function as shown in FIG. 20. Namely, a discrimination whether or not the time signal "t" or the stroke signal "st" is equal to or larger than a predetermined value "$t_1$" or "$st_1$". The predetermined time "$t_1$" and the predetermined stroke "$st_1$" corresponds to time and stroke of the squeezing plunger 45 that the actual stroke of the squeezing plunger 45 completes the copying of the desired curve programmed in the command signal setter 12.

When the result of the above-mentioned discrimination indicates "YES", a die opening command "Vo" is output from the die opening commander 19 to a not shown die opening cylinder.

In accordance with the present embodiment, since the die opening of the die casting machine is carried out in response to an advancement of the squeeze pressure applying plunger 45 performed in accordance with the programmed desired curve of the desired stroke of the squeezing plunger 45 versus an elapse of time, it is possible to avoid a cumbersome adjustment of the timing of opening of the casting dies at the final stage of each casting cycle.

From the foregoing description of the various embodiments of the present invention, it will be understood that, in accordance with the present invention, the stroke of the fluid-operated cylinder having a sliding piston element is controlled by a feedback control method to copy a desired curve of the desired stroke of the fluid-operated cylinder versus an elapse of time with the aid of a microcomputer or a personal computer. Therefore, by applying the fluid-operated cylinder to various hydraulic machines, such as die casting and injection molding machines and an extrusion machine, the die casting process, the injection molding process, and the extrusion process are precisely controlled with an excellent response characteristic, and accordingly, accurate and precise cast products, molded products, and extruded products are easily obtained.

Various modifications and changes can be made to the present invention without departing from the spirit and scope of the appended claims.

I claim:

1. A method of controlling a casting process for obtaining a cast product from a substance to be cast, the casting process including the steps of injecting the substance into a die cavity of a casting die with an injecting plunger and applying a squeeze pressure to the substance in the die cavity with a squeezing plunger, the method comprising the steps of:

predetermining a desired curve representing a desired amount of stroke movement of said squeezing plunger from a start of said stroke movement into said die cavity versus elapsed time starting from a beginning of gradual solidification of said substance in said die cavity due to cooling; and controlling actual stroke movement of said squeezing plunger from said start of said stroke movement to substantially conform to said desired curve when said squeeze pressure is applied to said substance in said die cavity.

2. A method of controlling a casting process as claimed in claim 1, wherein said step of controlling said actual stroke movement of said squeezing plunger comprises the steps of:

detecting the difference between a desired amount of stroke movement of said squeezing plunger derived from said desired curve and said actual stroke movement of said squeezing plunger; and controlling an operation of a fluid-operated cylinder operating said squeezing plunger in accordance with said detected difference.

3. A method of controlling process as claimed in claim 2, wherein said step of controlling said operation of said fluid-operated cylinder comprises the step of changing a fluid pressure applied to said fluid-operated cylinder from a fluid pressure source in accordance with an extent of said detected difference to control an operating force exerted by said fluid-operated cylinder for moving said squeezing plunger.

4. A method of controlling a casting process as claimed in claim 3, wherein said fluid pressure applied to said fluid-operated cylinder from the fluid pressure source is limited to a predetermined pressure level lower than a maximum level of fluid pressure of said fluid pressure source.

5. A method of controlling a casting process as claimed in claim 2, wherein said steps of controlling said operation of said fluid-operated cylinder comprises the step of:

applying first and second individual fluid pressures to first and second fluid chambers of said fluid-operated cylinder, respectively from a fluid pressure source; and changing said first and second fluid pressures independently in accordance with an extent of said detected difference to control an operating force exerted by said fluid-operated cylinder for moving said squeezing plunger.

6. A method of controlling a casting process as claimed in claim 1, wherein said step of predetermining a desired curve comprises the steps of:

programming said desired curve in an erasable memory means; and reading a desired amount of stroke movement of said squeezing plunger out of said erasable memory means in response to a signal indicating said elapsed of time from said start of stroke movement of said squeezing plunger into said die cavity.

7. A method of controlling a casting process as claimed in claim 1, further comprising the step of controlling said injecting plunger to maintain an injection pressure exerted by said injecting plunger at a constant level during said step of controlling the actual stroke movement of said squeezing plunger.

8. A method of controlling a casting process as claimed in claim 1, further comprising the step of controlling said injecting plunger to lower an injection pressure exerted by said injecting plunger when said step of controlling the actual stroke movement of said squeezing plunger is being carried out.

9. A method of controlling a casting process as claimed in claim 1, further comprising the step of controlling the injecting plunger by controlling an actual stroke movement of said injecting plunger in response to said step of controlling the actual stroke movement of said squeezing plunger.

10. A method of controlling a casting process as claimed in claim 1, wherein said substance to be cast comprises a molten metal and said squeezing plunger is operated by a fluid-operated cylinder including a hydraulic cylinder having a sliding piston connected to said squeezing plunger.

11. A method of controlling a casting process as claimed in claim 1, further comprising the steps of:

detecting a predetermined elapse of time after said start of stroke movement of said squeezing plunger;

generating a signal indicating that said casting die should be opened upon detection of said predetermined elapse of time; and ejecting said cast product from said die cavity.

12. A method of controlling a casting process as claimed in claim 1, further comprising the steps of:

detecting a predetermined amount of stroke movement of said squeezing plunger after said start of stroke movement of said squeezing plunger;

generating a signal indicating that said casting die should be opened upon detection of said predetermined amount of stroke movement of said squeezing plunger; and ejecting said cast product from said die cavity.

13. A method of controlling a casting process as claimed in claim 1, wherein said step of controlling the actual stroke movement of said squeezing plunger is carried out so that said actual stroke movement of said squeezing plunger vibratorily copies said desired curve.

14. A method of controlling a casting process as claimed in claim 1, further comprising the steps of:

predetermining a different desired curve representing an output force of said squeezing plunger versus elapsed time starting from a beginning of movement of said squeezing plunger into said die cavity;

controlling an actual output force of said squeezing plunger for a predetermined time interval, starting at a predetermined time after said start of stroke movement, when said squeezing pressure is applied to said substance in said die cavity.

15. A method of controlling a casting process as claimed in claim 14, wherein said steps of controlling said actual stroke movement and said actual output force of said squeezing plunger comprise:

detecting a first difference between a desired amount of stroke movement of said squeezing plunger derived from said desired curve and an actual amount of stroke movement of said squeezing plunger, and a second difference between a desired output force derived from said different desired curve and an actual output force of said squeezing plunger;

applying first and second independent fluid pressures from a fluid pressure source to first and second fluid chambers, respectively, of a fluid-operated cylinder operating said squeezing plunger; and changing said first and second fluid pressures independently in response to said detected first and second differences to control an operating force exerted by said fluid-operated cylinder.

16. An apparatus for controlling a casting operation of a casting machine including a casting die having a die cavity, an injecting plunger operable to inject a substance to be cast into the die cavity, a fluid-operated injecting cylinder operating the injecting plunger, a squeezing plunger slidably disposed in the casting die and operable to be moved into the die cavity to apply squeeze pressure to the substance injected into the die cavity, and a fluid-operated pressurizing cylinder operating the squeezing plunger, the apparatus comprising:

means for detecting a position of said squeezing plunger and generating an electrical signal corresponding to the position of the squeezing plunger;

valve means for changing an amount of fluid pressure supplied by a fluid pressure source to said fluid-operated pressurizing cylinder in response to a valve drive signal to control actual stroke movement of said squeezing plunger;

valve drive means for generating the valve drive signal in response to a drive command signal; and a first feedback control means including:

at least one command signal setting means for presetting a desired curve representing a desired amount of stroke movement of said squeezing plunger from a start of said stroke movement versus elapsed time starting from a beginning of gradual solidification of said substance in said die cavity due to cooling, said command signal setting means having means for generating an output signal corresponding to a desired position of said squeezing plunger derived from said desired curve; and a signal processing means for detecting an error between the electrical signal generated by said position detecting means and said output signal generated by said command signal setting means and generating said drive command signal corresponding to the error detected by said signal processing means to cause the actual stroke movement of said squeezing plunger to substantially conform to said desired curve.

17. An apparatus for controlling a casting operation of a casting machine as set forth in claim 16, wherein said command signal setting means includes a memory means for erasably storing said desired curve, said memory means being connected to said signal processing means, said signal processing means including an error detecting means for outputting a detecting signal indicating said error and a gain controlling means for converting said detecting signal into said drive command signal by applying a control gain to said detecting signal.

18. An apparatus for controlling a casting operation of a casting machine as set forth in claim 17, wherein said error detecting means and said gain controlling means of said signal processing means are at least a portion of a CPU.

19. An apparatus for controlling a casting operation of a casting machine as set forth in claim 17, wherein said gain controlling means includes means for changing said control gain applied to said detecting signal to cause actual stroke movement of said squeezing plunger to substantially conform to said desired curve in a vibratory manner.

20. An apparatus for controlling a casting operation of a casting machine as set forth in claim 16, wherein said fluid-operated pressurizing cylinder includes a sliding piston element including a movable piston and a piston rod extending from said piston and connected to said squeezing plunger, and first and second fluid chambers disposed on opposite sides of said movable piston, wherein said valve means includes a first fluid pressure control valve for changing a first fluid pressure supplied from said fluid pressure source to said first fluid chamber of said fluid-operated pressurizing cylinder and a second fluid pressure control valve for changing a second fluid pressure supplied from said fluid pressure source to said second fluid chamber of said fluid-operated pressurizing cylinder, said first and second fluid pressure control valves being connected to said first feedback control means by first and second valve drivers, respectively, of said valve drive means and being independently operated by said first feedback control means.

21. An apparatus for controlling a casting operation of a casting machine as set forth in claim 20, wherein said command signal setting means of said first feedback control means comprises a memory means for erasably storing said desired curve, said memory means being connected to said signal processing means, said signal processing means including an error detecting means for outputting a detecting signal indicating said error and a first gain controlling means for converting said detecting signal into a first feedback signal by applying a first control gain to said detecting signal, and a second gain controlling means for converting said detecting signal into a second feedback signal by applying a second control gain to said detecting signal, wherein said first gain controlling means is connected to said first fluid pressure control valve and said second gain controlling means is connected to said second fluid pressure control valve.

22. An apparatus for controlling a casting operation of a casting machine as set forth in claim 16, wherein said first feedback control means comprises a pressure limiter capable of limiting said drive command signal to thereby limit said fluid pressure supplied from said fluid pressure source to said fluid-operated pressurizing cylinder to a predetermined pressure level lower than a maximum level of fluid pressure for said fluid pressure source.

23. An apparatus for controlling a casting operation of a casting machine as set forth in claim 16, further comprising:

output force detecting means for generating an electrical signal representing actual output force exerted by said squeezing plunger;

a second feedback control means including at least one second command signal setting means for presetting a second desired curve representing a desired output force of said squeezing plunger versus elapsed time starting from said start of stroke movement of said squeezing plunger into said die cavity, said second command signal setting means including means for generating an output signal indicating a desired output force of said squeezing plunger derived from said desired curve, and second signal processing means for detecting an output force error between said output signal indicating a desired output force of said squeezing plunger derived from said desired curve and said electrical signal of said output force detecting means and generating said drive command signal as at least one feedback signal to be supplied to said valve drive means, said drive command signal corresponding to said output force error detected by said second signal processing means; and a controller switching means for selectively operating one of said first and second feedback control means.

24. An apparatus for controlling a casting operation of a casting machine as set forth in claim 16, further comprising means for controlling movement of said injecting plunger in response to said actual stroke movement of said squeezing plunger.

25. An apparatus for controlling a casting operation of a casting machine as set forth in claim 24, wherein said means for controlling the movement of said injecting plunger includes means for gradually retracting said injecting plunger from a position where said injecting plunger stops injecting said substance into said die cavity.

26. An apparatus for controlling a casting operation of a casting machine as set forth in claim 16, wherein said feedback control means further comprises means for generating a casting die opening command signal in response to a command signal from said command signal setting means.

* * * * *

UNITED STATES PATENT AND TRADEMARK OFFICE
CERTIFICATE OF CORRECTION

PATENT NO. : 5,119,866
DATED : JUNE 9, 1992
INVENTOR(S) : TAKESHI MIHARA

It is certified that error appears in the above-identified patent and that said Letters Patent is hereby corrected as shown below:

Claim 3, column 27, line 26, after "controlling" insert --a casting--.

Claim 5, column 27, line 42, change "steps" to --step--;
line 44, change "step" to --steps--; and
line 47, after "respectively" insert --,--.

Signed and Sealed this

Tenth Day of August, 1993

Attest:

MICHAEL K. KIRK

*Attesting Officer*     *Acting Commissioner of Patents and Trademarks*